(12) United States Patent
Tomioka et al.

(10) Patent No.: US 7,604,335 B2
(45) Date of Patent: Oct. 20, 2009

(54) INK CARTRIDGE

(75) Inventors: Hiroshi Tomioka, Tokyo (JP); Hiroyuki Takuhara, Tokyo (JP); Hideki Yamakami, Yokohama (JP); Yuuko Negishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 465 days.

(21) Appl. No.: 11/648,596

(22) Filed: Jan. 3, 2007

(65) Prior Publication Data

US 2007/0109371 A1    May 17, 2007

Related U.S. Application Data

(63) Continuation of application No. PCT/JP2006/314020, filed on Jul. 7, 2006.

(30) Foreign Application Priority Data

| Jul. 8, 2005 | (JP) | ............................. 2005-200760 |
| Jul. 8, 2005 | (JP) | ............................. 2005-200761 |
| Jul. 8, 2005 | (JP) | ............................. 2005-200955 |

(51) Int. Cl.
   *B41J 2/175* (2006.01)
(52) U.S. Cl. .............................. 347/86; 347/84; 347/85; 347/95; 106/31.27; 106/31.6
(58) Field of Classification Search .................. 347/84, 347/85, 86, 95; 106/31.27, 31.6
   See application file for complete search history.

(56) References Cited

U.S. PATENT DOCUMENTS 4,380,771 A * 4/1983 Takatori ....................... 347/43

| 5,169,437 | A | 12/1992 | You ........................ 106/31.58 |
| 6,540,327 | B1 * | 4/2003 | Akiyama et al. .............. 347/43 |
| 2002/0057319 | A1 * | 5/2002 | Saruta et al. ................... 347/86 |
| 2003/0232902 | A1 | 12/2003 | Takahashi et al. ........... 523/160 |

(Continued)

FOREIGN PATENT DOCUMENTS

EP    534634    3/1993

(Continued)

OTHER PUBLICATIONS

PCT International Preliminary Report on Patentability in corresponding PCT Application No. PCT/JP2006/314020, dated Jan. 17, 2008, and English language translation thereof.

*Primary Examiner*—Matthew Luu
*Assistant Examiner*—Rut Patel
(74) *Attorney, Agent, or Firm*—Fitzpatrick, Cella, Harper & Scinto

(57) ABSTRACT

An ink cartridge includes an ink-jet head and plural liquid chambers storing inks different from each other. The minimum value A1 (g/ml) for the ink densities of the inks stored in the plural liquid chambers and the maximum value B1 (g/ml) for the ink densities of inks each obtained by evaporating 10 mass % of each of the inks stored in the plural liquid chambers satisfy the relationship of $(B1-A1)/A1 \leq 0.100$. A stable image can be obtained, in which, even when the ink cartridge is stored for a long time period at the time of physical distribution, or is stored for a long time period in a state of being mounted on a recording apparatus so that the stored inks are brought into a situation in which the inks are apt to evaporate, a change in color balance is small as compared to an initial state.

11 Claims, 5 Drawing Sheets

U.S. PATENT DOCUMENTS

| | | | |
|---|---|---|---|
| 2005/0052515 A1 | 3/2005 | Udagawa et al. | 347/100 |
| 2007/0107627 A1 | 5/2007 | Negishi et al. | 106/31.27 |
| 2007/0109372 A1 | 5/2007 | Tomioka et al. | 347/86 |
| 2007/0109378 A1 | 5/2007 | Yamakami et al. | 347/100 |
| 2007/0109390 A1 | 5/2007 | Yamakami et al. | 347/105 |

FOREIGN PATENT DOCUMENTS

| | | |
|---|---|---|
| JP | 5-202328 | 8/1993 |
| JP | 5-214282 | 8/1993 |
| JP | 10-278290 | 10/1998 |
| JP | 11-240168 | 9/1999 |
| JP | 2002-331688 | 11/2002 |
| JP | 2003-73598 | 3/2003 |
| WO | WO 2004/096932 | 11/2004 |

* cited by examiner

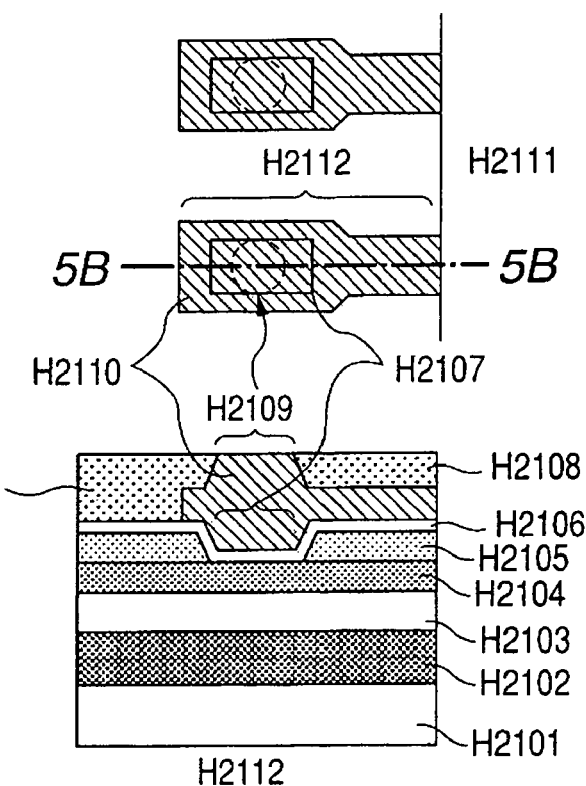
FIG. 5A
FIG. 5B
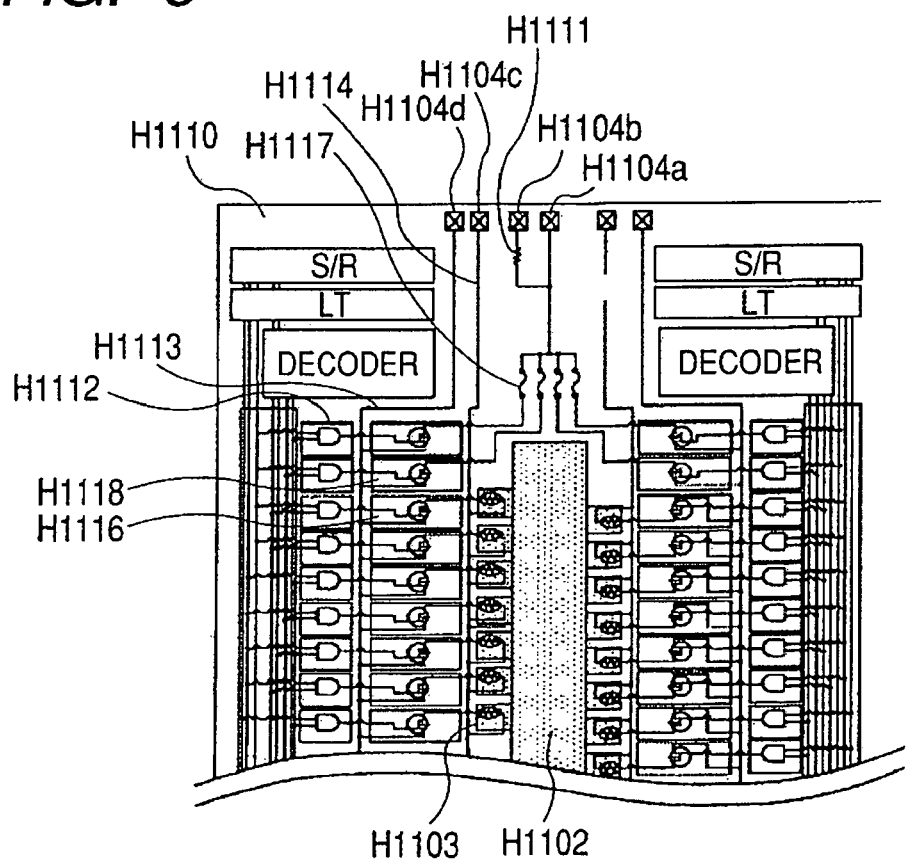
FIG. 6

INK CARTRIDGE

This application is a continuation of International Application No. PCT/JP2006/314020 filed on Jul. 7, 2006, which claims the benefit of Japanese Patent Application No. 2005-200760 filed on Jul. 8, 2005, Japanese Patent Application No. 2005-200955 filed on Jul. 8, 2005 and Japanese Patent Application No. 2005-200761 filed on Jul. 8, 2005.

BACKGROUND OF THE INVENTION

1. Field of the Invention

The present invention relates to an ink cartridge including an ink-jet head and plural liquid chambers storing inks different from each other.

2. Description of the Related Art

An ink-jet recording method is a recording method involving causing a small ink droplet to fly to plain paper or a dedicated glossy medium to form an image. The method has become rapidly widespread in association with advance of a reduction in price of a recording apparatus and an increase in recording rate of the apparatus. In addition, additional improvements in image quality such as an extreme reduction in size of an ink droplet to be flown and the expansion of a color gamut in association with the introduction of multicolor inks have progressed in recent years. In view of the foregoing, it has been desired to additionally suppress physical property changes with time of ink which may affect image property.

A physical property change resulting from evaporation is an example of the physical property changes with time of ink described above. An aqueous ink composition that can evaporate at a reduced speed has been disclosed as a technique concerning the problem (see Japanese Patent Application Laid-Open No. H05-214282). Means for suppressing the amount of evaporation of ink depending on the shape of an ink cartridge has been also disclosed (see Japanese Patent Application Laid-Open No. H10-278290). Further, a technique for suppressing the evaporation of ink by using a specific material as a packaging material for an ink cartridge has been disclosed (see Japanese Patent Application Laid-Open No. 2002-331688). Meanwhile, an ink having a density in a certain range has been disclosed (see Japanese Patent Application Laid-Open No. 2003-073598). An ink-jet recording method using two ink cartridges each capable of storing plural inks has been also disclosed (see Japanese Patent Application Laid-Open No. H05-202328).

SUMMARY OF THE INVENTION

However, the inventors of the present invention have found the following novel technical problem: when an ink cartridge including an ink-jet head and plural liquid chambers storing inks different from each other is used, an image is apt to change as a period for physical distribution or a period for use is prolonged.

Therefore, an object of the present invention is to provide an ink cartridge capable of providing an excellent image in which a change in color balance is suppressed even after physical distribution or long-term storage in, for example, a state where the ink cartridge is mounted on a recording apparatus.

The present invention solves the above-mentioned new problem. To be specific, the above-mentioned problem may be solved by the following constitution.

That is, the present invention relates to an ink cartridge including an ink-jet head and plural liquid chambers storing inks different from each other, characterized in that a minimum value A1 (g/ml) for ink densities of the inks stored in the plural liquid chambers and a maximum value B1 (g/ml) for ink densities of inks each obtained by evaporating 10 mass % of each of the inks stored in the plural liquid chambers satisfy a relationship of $(B1-A1)/A1 \leq 0.100$.

In the present invention, a relationship between the ink density of ink in an initial state and the ink density of ink obtained by evaporating 10 mass % of the ink in an initial state is specified. A reduction of 10 mass % is the maximum evaporation rate that may be able to occur under ordinary conditions for use. Further, when the maximum evaporation rate that may be able to occur under additionally severe conditions for use is also assumed, it is preferable to specify a relationship between the ink density of ink in an initial state and the ink density of ink obtained by evaporating 15 mass % of the ink in an initial state.

In addition, the term "initial state" described above refers to the state of ink before evaporation, and there is no need to take, for example, a period elapsed from the preparation of the ink and a period elapsed from the injection of the ink into an ink cartridge into consideration. Even when the initial state is defined as described above, an ink-jet cartridge satisfying the constitution of the present invention can exert the above-mentioned significant effect. The reason for this is considered to be as follows: an ink cartridge that can be used under ordinary conditions can evaporate at least 15% or more of ink, and the density of the ink changes with an evaporation rate in a nearly linear fashion in the evaporation rate range, so there is no need to take the elapsed periods into consideration.

According to the present invention, there is provided an ink cartridge capable of providing a stable image in which, even in, for example, the case where the ink cartridge storing ink which is apt to evaporate is stored for a long time period at the time of physical distribution or the case where the ink cartridge is stored for a long time period in a state of being mounted on a recording apparatus, a change in color balance is small as compared to an initial state before the storage.

Further features of the present invention will become apparent from the following description of exemplary embodiments (with reference to the attached drawings).

BRIEF DESCRIPTION OF THE DRAWINGS

FIGS. 5A and 5B are views each schematically showing the nozzle structure of a thermal ink-jet head.

FIG. 6 is a view schematically showing an Si substrate.

DESCRIPTION OF THE EMBODIMENTS

Figure 1:
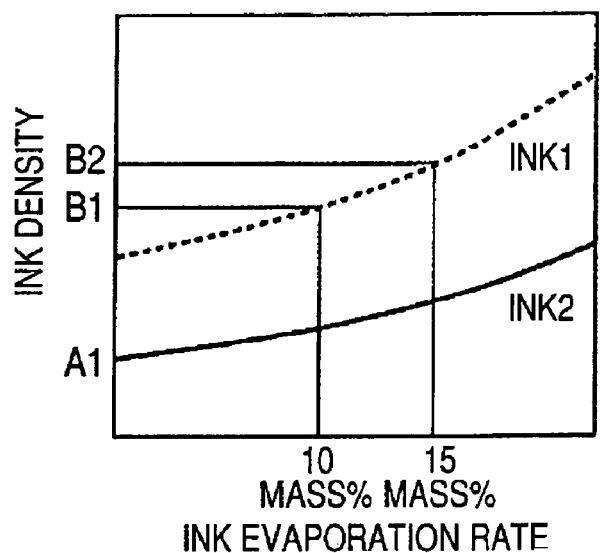
FIG. 1 is a view schematically showing a relationship between an ink evaporation rate and ink density.

According to the investigation conducted by the inventors of the present invention, the reason why the above-mentioned significant effect is exerted by the present invention is as described below.

Ink-jet ink contains a volatile component in ordinary cases. A phenomenon in which the volatile component evaporates from the liquid chamber in which the ink is stored to the atmosphere at the time of physical distribution or in a state where an ink cartridge is mounted on the main body of a recording apparatus occurs in some cases. Meanwhile, a liquid chamber storing ink-jet ink is requested to have various properties such as moldability, weldability, ink resistance, mechanical strength, and a low coefficient of thermal expansion. Accordingly, a material having some degree of permeability to gases is used to constitute a liquid chamber in some cases. In particular, in an ink cartridge including an ink-jet head and plural liquid chambers storing inks different from each other, emphasis is placed on moldability, weldability, and heat stability, so each liquid chamber is constituted of a material having relatively high permeability to gases in some cases. When ink is stored for a long time period in a state of being stored in such liquid chamber, an ink component is apt to evaporate, and the physical properties of the ink are apt to change. The change does not necessarily occur uniformly among the respective inks because the change is affected also by, for example, ink composition and the shape of a liquid chamber. To be specific, in a state where ink is unused such as physical distribution, the evaporation rate of the ink is largely affected by a water content in the ink and the area of a surface in which the ink can evaporate. However, the density of ink may be largely affected by the kinds and amounts of a colorant and a solvent in the ink even when a water content and the area of a surface in which the ink can evaporate remain unchanged. Further, in the case where the ink cartridge is stored in a state of being mounted on the main body of a recording apparatus, the remaining amounts of inks ordinarily vary from color to color depending on a situation in which the inks are used. Accordingly, a difference in evaporation rate between the respective inks becomes additionally remarkable, and differences in colorant concentration and in amount of change in ink density between the inks also become additionally large.

When the concentration of a colorant and the density of ink largely change in association with the condensation of the ink, the amount of the colorant in an ink droplet to be ejected also largely changes. As a result, the amount of the colorant to be applied to a recording medium in the case where ink before evaporation (initial state) is used is different from the amount of the colorant to be applied to the recording medium in the case where ink after evaporation is used. In particular, when inks are different from each other in colorant concentration and in rate of change in ink density, an influence on an image is extremely large. This is because a color balance in the initial state and a color balance after evaporation are different from each other. This is the above-mentioned novel technical problem found by the inventors of the present invention. The present invention can solve the novel technical problem.

FIG. 1 schematically shows the manner in which the ink density of each of two different inks changes owing to the evaporation of a volatile component. As shown in the figure, the density of each of the two inks increases owing to the evaporation of a volatile component. In an actual use environment, there is substantially no case where two or more inks are used in equal amounts. Accordingly, depending on a situation in which inks are used, the following situation is predicted: only a specific ink is stored in a state where the amount of the ink is extremely small, and the evaporation of the ink progresses abruptly as compared to any other ink.

For example, suppose that each of Ink 1 and Ink 2 shown in FIG. 1 is ink of which an ink set is constituted, the ink set is stored in an ink cartridge and used, Ink 1 is used in an extremely large amount, and nearly no part of Ink 2 is used. In this case, the remaining amount of Ink 1 becomes extremely small, so the evaporation rate of Ink 1 increases. In contrast, the remaining amount of Ink 2 is large, so the evaporation rate of Ink 2 is smaller than that of Ink 1 even when Ink 2 is left for the same period as that of Ink 1. Here, when the evaporation rate of Ink 1 (that is, a rate of reduction due to the evaporation of the ink) is 10 mass % which is close to the maximum evaporation rate in a general use state of an ink tank, a difference in evaporation rate between Ink 1 and Ink 2 is up to 10 mass %. In a like manner, when the evaporation rate of Ink 1 is 15 mass % which is close to the maximum evaporation rate in the case where an ink tank is used under a severe environment, a difference in evaporation rate between Ink 1 and Ink 2 is up to 15 mass %.

In such case, Ink 1 which evaporates in the largest amount has the highest ink density after the evaporation in the ink set, and Ink 2 having the lowest evaporation rate has the lowest ink density. When a difference in density between both the inks after the evaporation is excessively large, a difference in colorant concentration in an ink droplet to be ejected between the two inks is additionally enlarged owing to an increase in amount of ink to be ejected due to the difference in density between the respective inks as well as an increase in colorant concentration due to condensation by evaporation. As a result, a balance between the colorant concentrations of the inks in initial states to be applied onto a recording medium is largely different from a balance between the colorant concentrations of the inks to be applied onto the recording medium after evaporation, so the color balance of an image to be obtained is significantly deteriorated.

As described above, the deterioration of a color balance must be minimized while the evaporation of ink as well as various situations in each of which the ink is used is taken into consideration. The inventors of the present invention have found that it is sufficient to control a difference between the minimum value for ink densities in an initial state and the maximum value for ink densities after evaporation to fall within a certain range to minimize the deterioration. To be more specific, plural inks to be stored in an ink cartridge are combined in such a manner that the minimum value A1 (g/ml) for the ink densities of the plural inks before evaporation and the maximum value B1 (g/ml) for the ink densities of the respective inks each obtained by evaporating 10 mass % of each of the plural inks satisfy the relationship of $(B1-A1)/A1 \leq 0.100$.

In addition, the higher the evaporation rate of ink, the higher the possibility that the deterioration of a color balance is caused. Accordingly, the above-mentioned ink density control is preferably performed with enhanced strictness under a severe use environment such as a high-temperature, low-humidity environment. To be specific, A1 described above and the maximum value B2 (g/ml) for the ink densities of the respective inks each obtained by evaporating 15 mass % of each of the plural inks preferably satisfy the relationship of $(B2-A1)/A1 \leq 0.070$.

In addition, in the present invention, A1 and B1 described above more preferably satisfy the relationship of $(B1-A1)/A1 \leq 0.060$. When the plural inks are a yellow ink, a magenta ink, and a cyan ink, a value for $(B1-A1)/A1$ is preferably within the range. Further, in the present invention, A1 and B2 described above preferably satisfy the relationship of $(B2-A1)/A1 \leq 0.050$. With such constitution, variations in the amounts of the respective inks to be ejected are additionally alleviated, and an image having not only a good color balance of a plain color but also a good color balance of a secondary color can be obtained. Further, in the present invention, A1 and B2 described above preferably satisfy the relationship of $(B2-A1)/A1 \leq 0.040$. When the plural inks are a yellow ink, a magenta ink, and a cyan ink, a value for $(B2-A1)/A1$ is preferably within the range.

Further, in the present invention, A1 and B1 described above more preferably satisfy the relationship of $(B1-A1)/A1 \leq 0.040$. When the plural inks are a yellow ink, a light magenta ink, and a light cyan ink, a value for $(B1-A1)/A1$ is preferably within the range. The definition of light ink in the present invention will be descried later. Further, in the present invention, A1 and B2 described above more preferably satisfy the relationship of $(B2-A1)/A1 \leq 0.030$. With such constitution, variations in the amounts of the respective inks to be ejected are additionally alleviated, and an image excellent in color balance in a half tone region of a plain color or of a secondary color can be obtained. Although a gray image having a low density of all gray images is particularly susceptible to variations in the amounts of inks to be ejected, a gray image having a low density and a good color balance can be obtained when a value for $(B2-A1)/A1$ is within the range. When the plural inks are a yellow ink, a light magenta ink, and a light cyan ink, a value for $(B1-A1)/A1$ and a value for $(B2-A1)/A1$ are preferably within the ranges.

In addition, in the present invention, a difference between the ink density of ink before evaporation and the ink density of the ink after the evaporation is preferably 0.030 g/ml or less when the evaporation rate of the ink is 10 mass %. The difference is preferably 0.020 g/ml or less when the evaporation rate is 15 mass %. With such constitution, variations in the amounts of the respective inks to be ejected are additionally alleviated, and an image having a good color balance in a half tone region of a plain color or of a secondary color can be stably obtained. The difference is particularly preferably 0.020 g/ml or less when the evaporation rate of the ink is 10 mass % while the difference is particularly preferably 0.018 g/ml or less when the evaporation rate is 15 mass %. A gray image having an additionally good color balance can be obtained when the difference is within the range. When the plural inks are a yellow ink, a magenta ink, and a cyan ink, the difference is preferably within the range.

As described above, in the present invention, the evaporation rates of plural different inks are preferably as uniform as possible.

Inks probably tend to evaporate uniformly in a storage state such as the case where an ink cartridge is stored for a long time period at the time of physical distribution or the case where the ink cartridge is mounted on the main body of a recording apparatus and is then left for a long time period while the ink cartridge is not used very frequently. In particular, the case where a cartridge outputs different results depending on a period for physical distribution in spite of the fact that the cartridge is new is not preferable in terms of the quality of a product, so there arises the need for managing printing property with improved severeness. To this end, the areas of the portions of inks exposed to the atmosphere are preferably uniformized so that each of them has a certain value or lower. Further, in order that the amount of evaporation of ink may be suppressed and the evaporation of the ink from the casing of an ink cartridge may be suppressed as far as possible, the shape of air vent provided for the ink cartridge is preferably a so-called labyrinth structure in which a communication path has a bent portion. The specific constitution of the structure will be described in the section titled "Ink cartridge" below.

In addition, in the present invention, the minimum value C1 (g/ml) and the maximum value D1 (g/ml) for the ink densities of the respective inks each obtained by evaporating 10 mass % of each of the plural inks preferably satisfy the relationship of $(D1-C1)/C1 \leq 0.090$. As a result of such control, the evaporation rates of the respective inks can be uniformized, and a relationship between ink densities at the time of evaporation can be suppressed to fall within an additionally preferable range.

In addition, in the present invention, the minimum value C2 (g/ml) and the maximum value D2 (g/ml) for the ink densities of the respective inks each obtained by evaporating 15 mass % of each of the plural inks more preferably satisfy the relationship of $(D2-C2)/C2 \leq 0.060$.

Further, in the present invention, C1 and D1 described above preferably satisfy the relationship of $(D1-C1)/C1 \leq 0.055$. In addition, C2 and D2 described above more preferably satisfy the relationship of $(D2-C2)/C2 \leq 0.035$. With such constitution, variations in the amounts of the respective inks to be ejected are additionally alleviated, and an image having not only a good color balance of a plain color but also a good color balance of a secondary color can be obtained. When the plural inks are a yellow ink, a magenta ink, and a cyan ink, a value for $(D1-C1)/C1$ and a value for $(D2-C2)/C2$ are preferably within the ranges.

Further, in the present invention, C1 and D1 described above more preferably satisfy the relationship of $(D1-C1)/C1 \leq 0.035$. In addition, C2 and D2 described above more preferably satisfy the relationship of $(D2-C2)/C2 \leq 0.030$. With such constitution, variations in the amounts of the respective inks to be ejected are additionally alleviated, and an image having a good color balance in a half tone region of a plain color or of a secondary color can be stably obtained. When the plural inks are a yellow ink, a light magenta ink, and a light cyan ink, a value for $(D1-C1)/C1$ and a value for $(D2-C2)/C2$ are preferably within the ranges. The definition of light ink in the present invention will be descried later.

(Ink)

It is impossible to describe all combinations of such ink physical properties as described above because the physical properties are affected by various factors such as the amount of water, the kind and amount of a solvent, the kind and amount of a colorant, and the kind and amount of any other additives. Further, in the present invention, as is apparent from the above-mentioned technical idea of the present invention, a state where the physical properties of plural inks satisfy a specific relationship is the essential component, and specific means for satisfying such ink physical properties is not limited. Hereinafter, the preferable constitutions of inks to be used in the present invention will be shown. It should be noted that the present invention can be practiced by appropriately combining those constitutions.

An ink cartridge according to the present invention has a combination of plural different inks, but a combination of ink colors is not particularly limited. Specific examples of the ink set include: an ink set of inks for three basic colors, that is, cyan, magenta, and yellow colors; an ink set having a black ink, and a cyan ink having a low colorant concentration and a magenta ink having a low colorant concentration (so-called light cyan ink and light magenta ink) and suitable for outputting a photographic image; and an ink set having spot color inks, that is, red, green, and blue inks. However, in the present invention, an ink set is not particularly limited to those ink sets. It should be noted that, as described above, a preferable range for a relationship between the ink density of ink in an initial state and the ink density of the ink after evaporation may vary depending on what kinds of inks are used in combination. The term "light cyan ink" as used in the present invention refers to a cyan ink having the lower colorant concentration of two kinds of cyan inks having different colorant concentrations. In addition, the term "light magenta ink" refers to a magenta ink having the lower colorant concentration of two kinds of magenta inks having different colorant concentrations. In the present invention, the colorant concentration of dense ink is preferably 2 mass % or more to 10 mass % or less, or particularly preferably 6 mass % or less, with respect to the total mass of the ink. In addition, the colorant concentration of light ink is preferably 0.3 mass % or more to 3 mass % or less, or particularly preferably 2 mass % or less. Hereinafter, an ink component will be described.

(Colorant)

Inks of which the ink set according to the present invention is constituted have only to be plural different inks. A colorant to be incorporated into each of the inks is not particularly limited, and any one of the colorants listed below can be appropriately incorporated into each of the inks. Examples of the colorant that can be incorporated into each of the inks are given below, but the colorant is not limited to the following.

C.I. Direct Yellow: 8, 11, 12, 27, 28, 33, 39, 44, 50, 58, 85, 86, 87, 88, 89, 98, 100, 110, 132, 173, and the like
C.I. Acid Yellow: 1, 3, 7, 11, 17, 23, 25, 29, 36, 38, 40, 42, 44, 76, 98, 99, and the like
C.I. Food Yellow: 3 and the like
C.I. Pigment Yellow: 1, 2, 3, 12, 13, 14, 15, 16, 17, 73, 74, 75, 83, 93, 95, 97, 98, 114, 128, 138, 180, and the like
C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, and the like
C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, and the like
C.I. Food Red: 87, 92, 94, and the like
C.I. Direct Violet: 107 and the like
C.I. Pigment Red: 2, 5, 7, 12, 48:2, 48:4, 57:1, 112, 122, 123, 168, 184, 202, and the like
C.I. Direct Blue: 1, 15, 22, 25, 41, 76, 77, 80, 86, 90, 98, 106, 108, 120, 158, 163, 168, 199, 226, 307, and the like
C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244, and the like
C.I. Pigment Blue: 1, 2, 3, 15, 15:2, 15:3, 15:4, 16, 22, 60, and the like
C.I. Acid Orange: 7, 8, 10, 12, 24, 33, 56, 67, 74, 88, 94, 116, 142, and the like
C.I. Acid Red: 111, 114, 266, 374, and the like
C.I. Direct Orange: 26, 29, 34, 39, 57, 102, 118, and the like
C.I. Food Orange: 3 and the like
C.I. Reactive Orange: 1, 4, 5, 7, 12, 13, 14, 15, 16, 20, 29, 30, 84, 107, and the like
C.I. Disperse Orange: 1, 3, 11, 13, 20, 25, 29, 30, 31, 32, 47, 55, 56, and the like
C.I. Pigment Orange: 43 and the like
C.I. Pigment Red: 122, 170, 177, 194, 209, 224, and the like
C.I. Acid Green: 1, 3, 5, 6, 9, 12, 15, 16, 19, 21, 25, 28, 81, 84, and the like
C.I. Direct Green: 26, 59, 67, and the like
C.I. Food Green: 3 and the like
C.I. Reactive Green: 5, 6, 12, 19, 21, and the like
C.I. Disperse Green: 6, 9, and the like
C.I. Pigment Green: 7, 36, and the like
C.I. Acid Blue: 62, 80, 83, 90, 104, 112, 113, 142, 203, 204, 221, 244, and the like
C.I. Reactive Blue: 49 and the like
C.I. Acid Violet: 17, 19, 48, 49, 54, 129, and the like
C.I. Direct Violet: 9, 35, 47, 51, 66, 93, 95, 99, and the like
C.I. Reactive Violet: 1, 2, 4, 5, 6, 8, 9, 22, 34, 36, and the like
C.I. Disperse Violet: 1, 4, 8, 23, 26, 28, 31, 33, 35, 38, 48, 56, and the like
C.I. Pigment Blue: 15:6 and the like
C.I. Pigment Violet: 19, 23, 37, and the like
C.I. Direct Black: 17, 19, 22, 31, 32, 51, 62, 71, 74, 112, 113, 154, 168, 195, and the like
C.I. Acid Black: 2, 48, 51, 52, 110, 115, 156, and the like
C.I. Food Black: 1, 2, and the like
Carbon Black In addition, examples of other colorants which can be preferably used in the present invention include colorants each represented by any one of the following general formulae (1) to (7):

General formula (1)

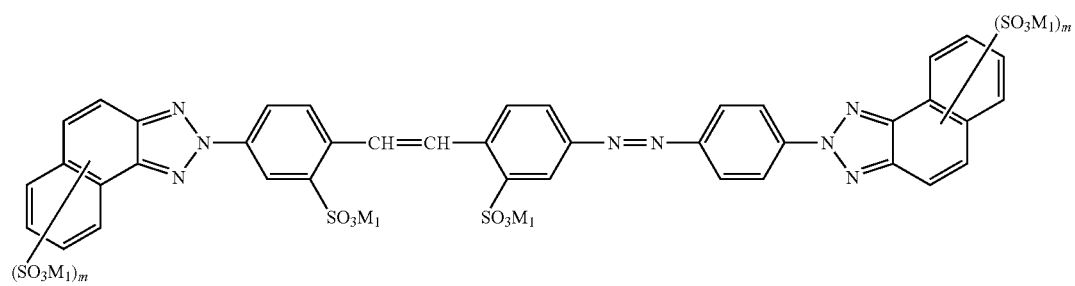

where each m each independently represents 1 or 2, and each $M_1$ independently represents a hydrogen atom, an alkali metal, an alkali earth metal, or a cation or ammonium ion of an organic amine.

Specific suitable examples of the structure of the colorant represented by the general formula (1) include, but not particularly limited to, such structures as shown in Table 1 below. For convenience, cyclic structures at both terminals of the colorant represented by the general formula (1) are defined as an A ring and a B ring, and a substitution position is defined as shown in the following general formula (2). Numbers shown in Table 1 below each represent the substitution position of a sulfonic group in each of Exemplified Compounds Y1 to Y5:

General formula (2)

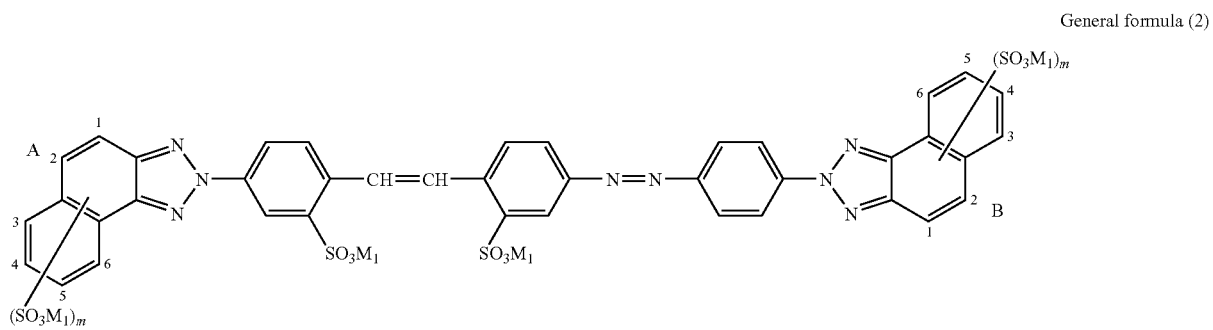

where each m independently represents 1 or 2, and each $M_1$ independently represents a hydrogen atom, an alkali metal, an alkali earth metal, or a cation or ammonium ion of an organic amine.

TABLE 1

Exemplified Compounds Y1 to Y4

| No. | Position of substituent of A ring | Position of substituent of B ring |
|---|---|---|
| Y1 | 2 | 4 |
| Y2 | 4 | 4 |
| Y3 | 2 | 4, 6 |
| Y4 | 4, 6 | 4 |

Specific suitable examples of the structure of the colorant represented by the general formula (2) include, but not particularly limited to, Exemplified Compound Y1 as shown in the following formula.

General formula (3)

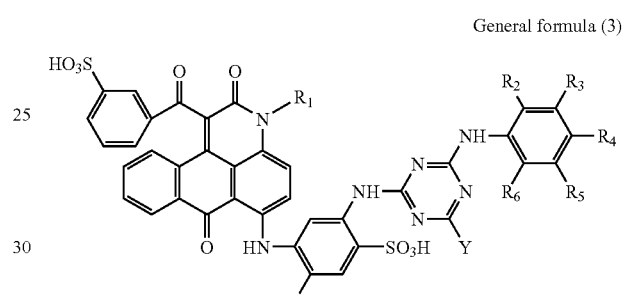

where $R_1$ represents any one of a hydrogen atom, an alkyl group, a hydroxy lower alkyl group, a cyclohexyl group, a monoalkyl aminoalkyl or dialkyl aminoalkyl group, and a cyano lower alkyl group, Y represents any one of a chlorine atom, a hydroxyl group, an amino group, and a monoalkylamino or dialkylamino group which may have a substituent selected from the group consisting of a sulfonic group, a carboxyl group, and a hydroxyl group on the alkyl group, and $R_2$, $R_3$, $R_4$, $R_5$, and $R_6$ each independently represent any one of a hydrogen atom, an alkyl group having 1 to 8 carbon atoms, and a carboxyl group provided that $R_2$, $R_3$, $R_4$, $R_5$, and $R_6$ do not simultaneously represent hydrogen atoms.

Exemplified Compound Y1

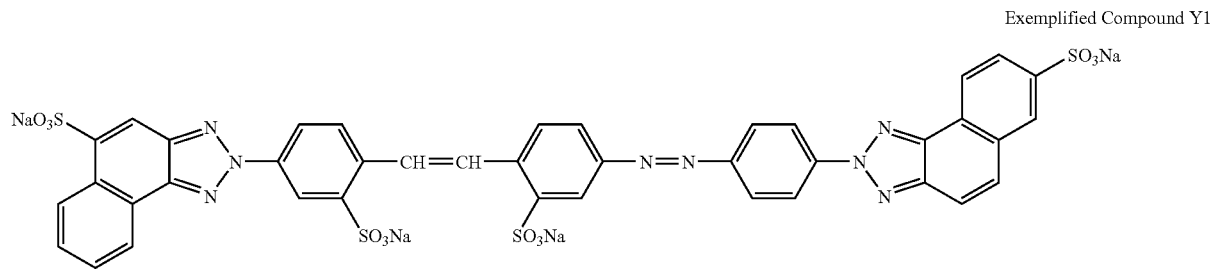

Other examples of a yellow-based colorant include compounds having structures described in WO 99/43754 and WO 02/081580:

Preferable specific examples of the colorant represented by the general formula (3) include Exemplified Compounds M1 to M7 having the following structures in free acid forms. In the present invention, Exemplified Compound M7 among those compounds is particularly preferably used:
Exemplified Compound M1
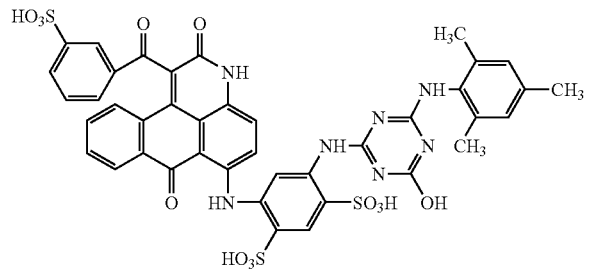
Exemplified Compound M2
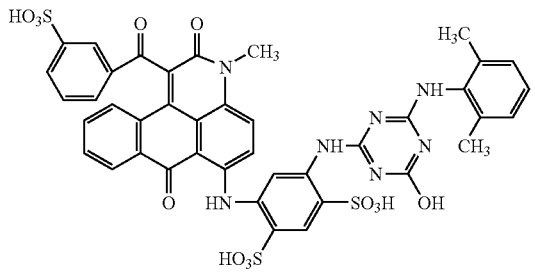
Exemplified Compound M3
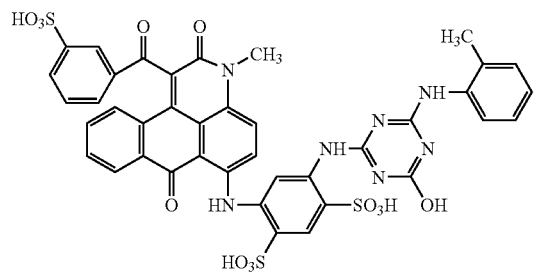
Exemplified Compound M4
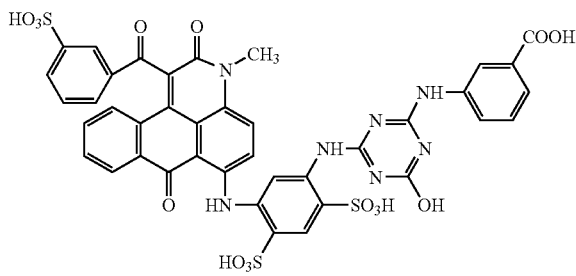
Exemplified Compound M5
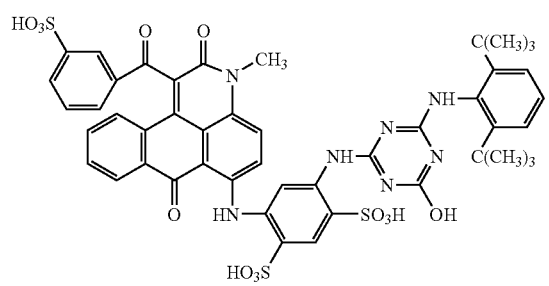
Exemplified Compound M6
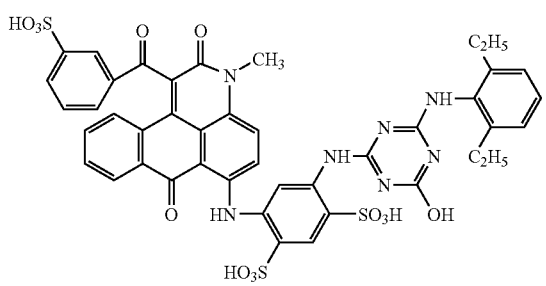
Exemplified Compound M7
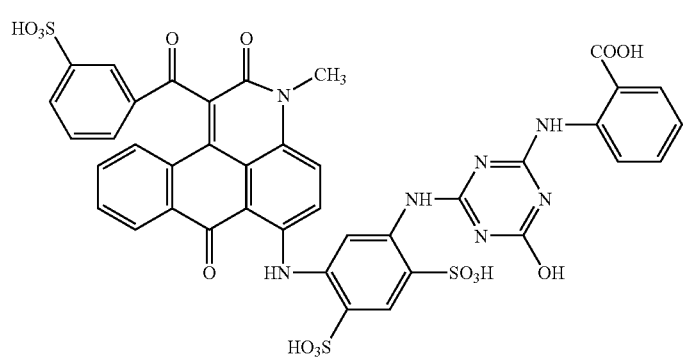

-continued

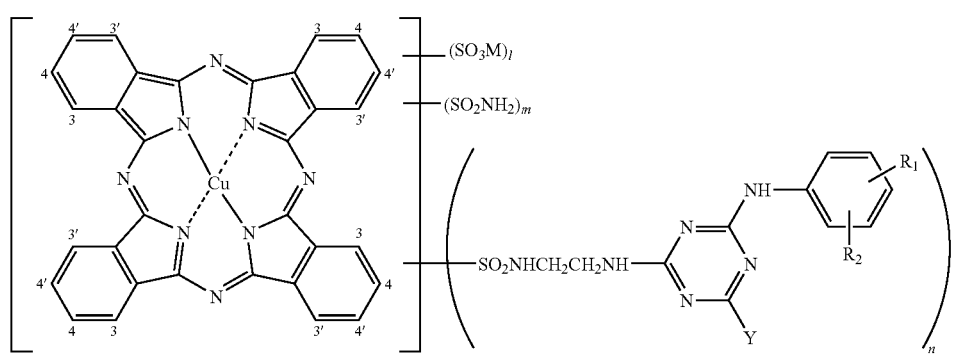

General Formula (4)

where l=0 to 2, m=1 to 3, and n=1 to 3 provided that l+m+n=3 or 4, the substitution position of a substituent is 4- or 4'-position, M represents an alkali metal or ammonium, $R_1$ and $R_2$ each independently represent any one of a hydrogen atom, a sulfonic group, and a carboxyl group provided that $R_1$ and $R_2$ do not simultaneously represent hydrogen atoms, and Y represents any one of a chlorine atom, a hydroxyl group, an amino group, and a monoalkylamino or dialkylamino group.

Of the colorants each represented by the general formula (4), a phthalocyanine compound which is obtained by using a 4-sulfophthalic acid derivative or a phthalocyanine compound, which is obtained by causing a 4-sulfophthalic acid derivative and a phthalic acid derivative (or a phthalic anhydride derivative) to react with each other in the presence of a metal compound, as a raw material; and causing the raw material to react with an aminating agent in the presence of an organic amine after the transformation of a sulfonic group into a chlorosulfone group is preferably used. That is, it has been found that ink using, as a colorant, a phthalocyanine compound obtained by introducing an unsubstituted sulfamoyl group ($-SO_2NH_2$) and a substituted sulfamoyl group [the following general formula (5)] into only 4- and 4'-positions in the formula (4) is extremely excellent in environmental gas resistance:

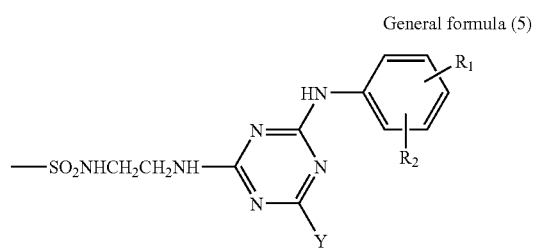

General formula (5)

where $R_1$ and $R_2$ each independently represent any one of a hydrogen atom, a sulfonic group, and a carboxyl group provided that $R_1$ and $R_2$ do not simultaneously represent hydrogen atoms, and Y represents any one of a chlorine atom, a hydroxyl group, an amino group, and a monoalkylamino or dialkylamino group.

Preferable specific examples of the group represented by the general formula (5) include groups having the following structures in free acid forms. Of those, Exemplified Compound C1 is particularly preferably used.

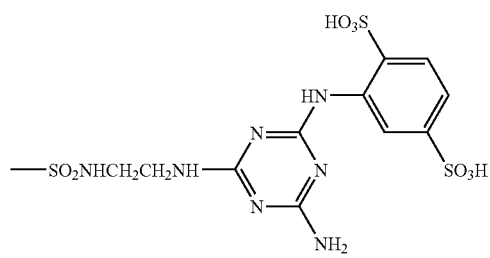

Exemplified Compound C1

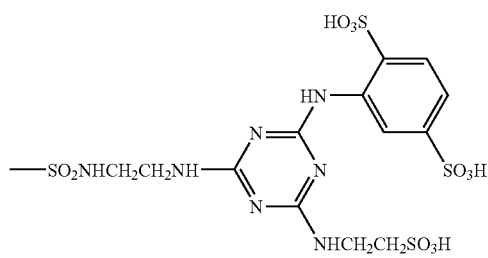

Exemplified Compound C2

-continued

Exemplified Compound C3
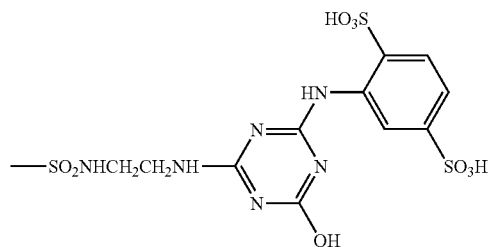

Exemplified Compound C4
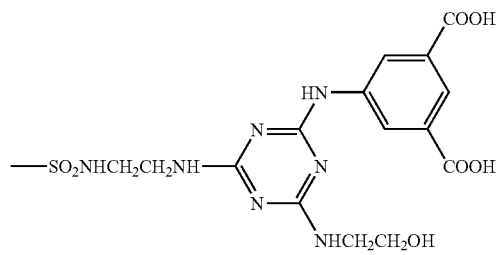

Exemplified Compound C5
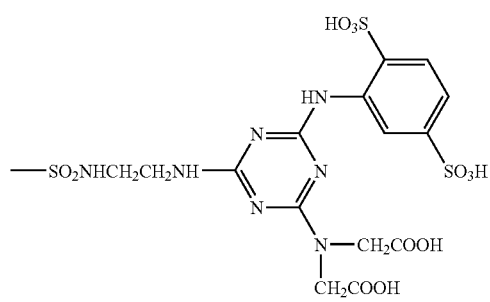

Exemplified Compound C6
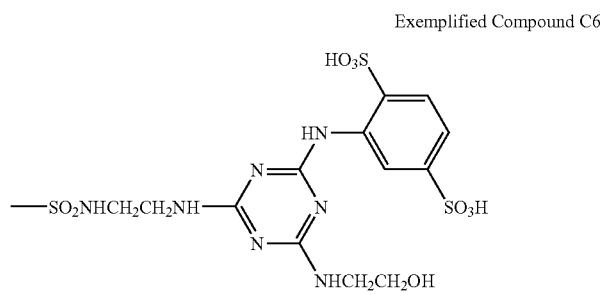

Exemplified Compound C7
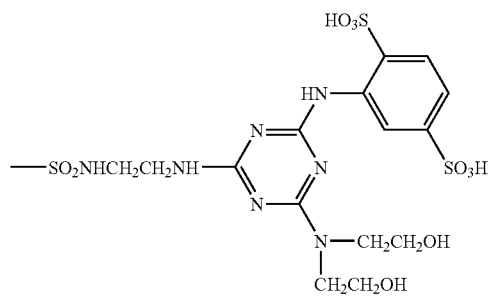

General formula (6)
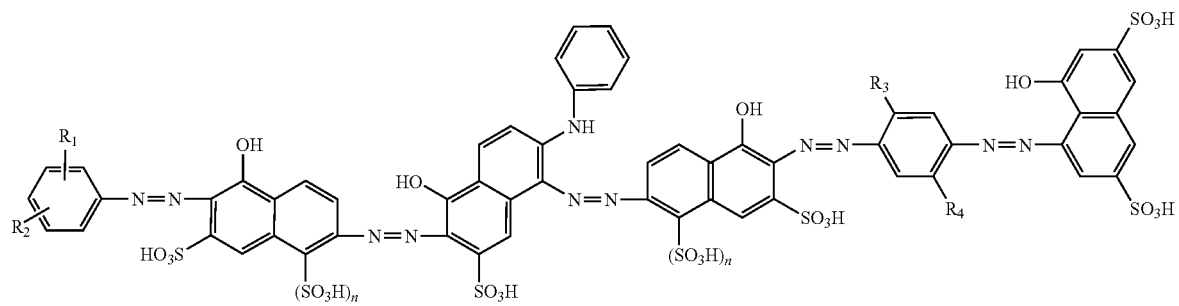

where $R_1$ and $R_2$ each independently represent a hydrogen atom, a hydroxyl group, an amino group, a carboxyl group, a sulfonic group, an alkyl group having 1 to 4 carbon atoms, or an alkoxy group having 1 to 4 carbon atoms, $R_3$ and $R_4$ each independently represent a hydrogen atom, an alkyl group having 1 to 4 carbon atoms, an alkoxy group having 1 to 4 carbon atoms, a hydroxyl group, an alkyl group which has 1 to 4 carbon atoms and which may be substituted by a hydroxyl group or an alkoxy group having 1 to 4 carbon atoms, an alkoxy group which has 1 to 4 carbon atoms and which may be substituted by a hydroxyl group, an alkoxy group having 1 to 4 carbon atoms, a sulfonic group, or a carboxyl group, or an amino group substituted by an alkyl group or an acyl group, and n represents 0 or 1;

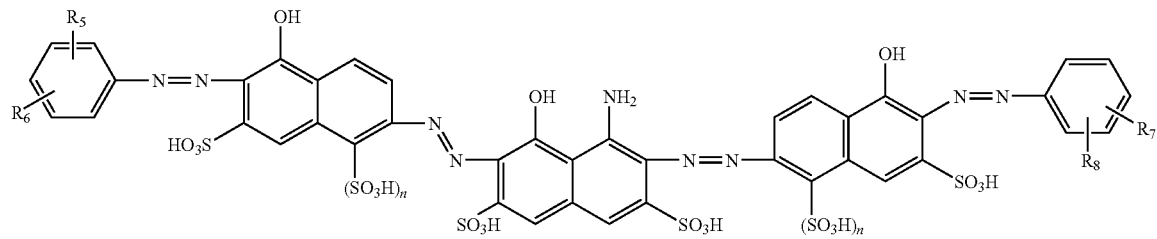

General formula (7)

where $R_5$, $R_6$, $R_7$, and $R_8$ each independently represent a hydrogen atom, a hydroxyl group, an amino group, a carboxyl group, a sulfonic group, an alkyl group having 1 to 4 carbon atoms, an alkoxy group having 1 to 4 carbon atoms, an alkoxy group substituted by a hydroxyl group, an alkoxy group having 1 to 4 carbon atoms, a sulfonic group, or a carboxyl group, an alkoxy group which has 1 to 4 carbon atoms and which may be additionally substituted by a carboxyl group or a sulfonic group, or an amino group substituted by a phenyl group, an alkyl group, or an acyl group, and n represents 0 or 1.

Exemplified Compounds Bk1 to Bk3 are shown below in free acid forms as preferable specific examples of the colorant represented by the formula (6), and Exemplified Compounds Bk4 to Bk6 are shown below in free acid forms as preferable specific examples of the colorant represented by the formula (7). However, the colorant to be used in the present invention is not limited to those compounds. In addition, two or more kinds of such colorants as shown below may be simultaneously used. It is particularly preferable to use Exemplified Compound Bk3 and Exemplified Compound Bk4 among the above-mentioned compounds simultaneously.

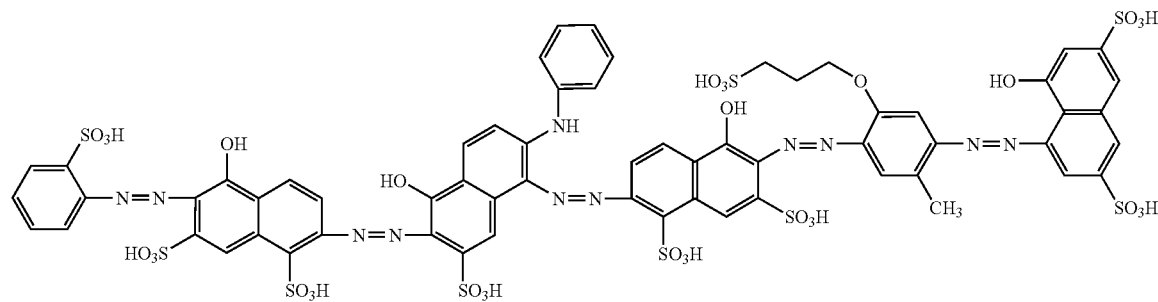

Exemplified Compound Bk1

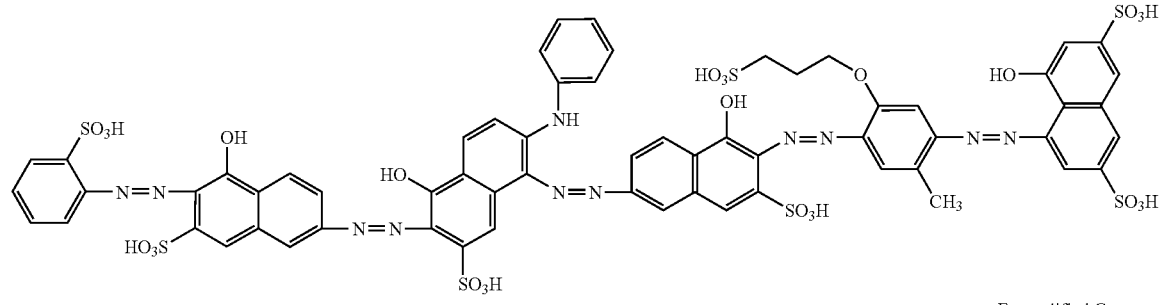

Exemplified Compound Bk2

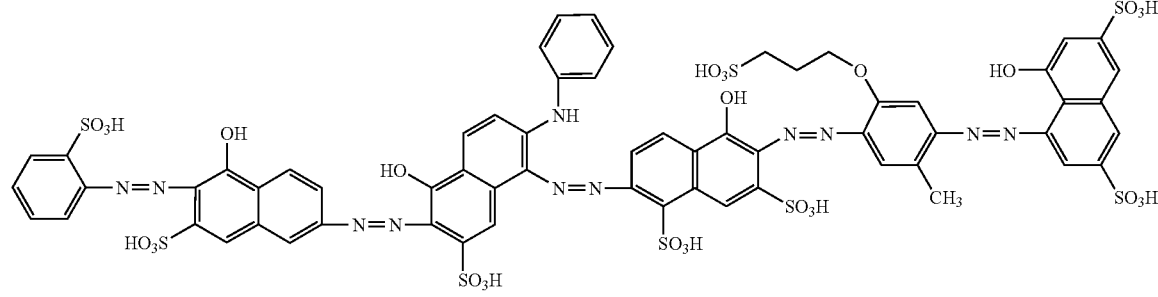

Exemplified Compound Bk3

-continued

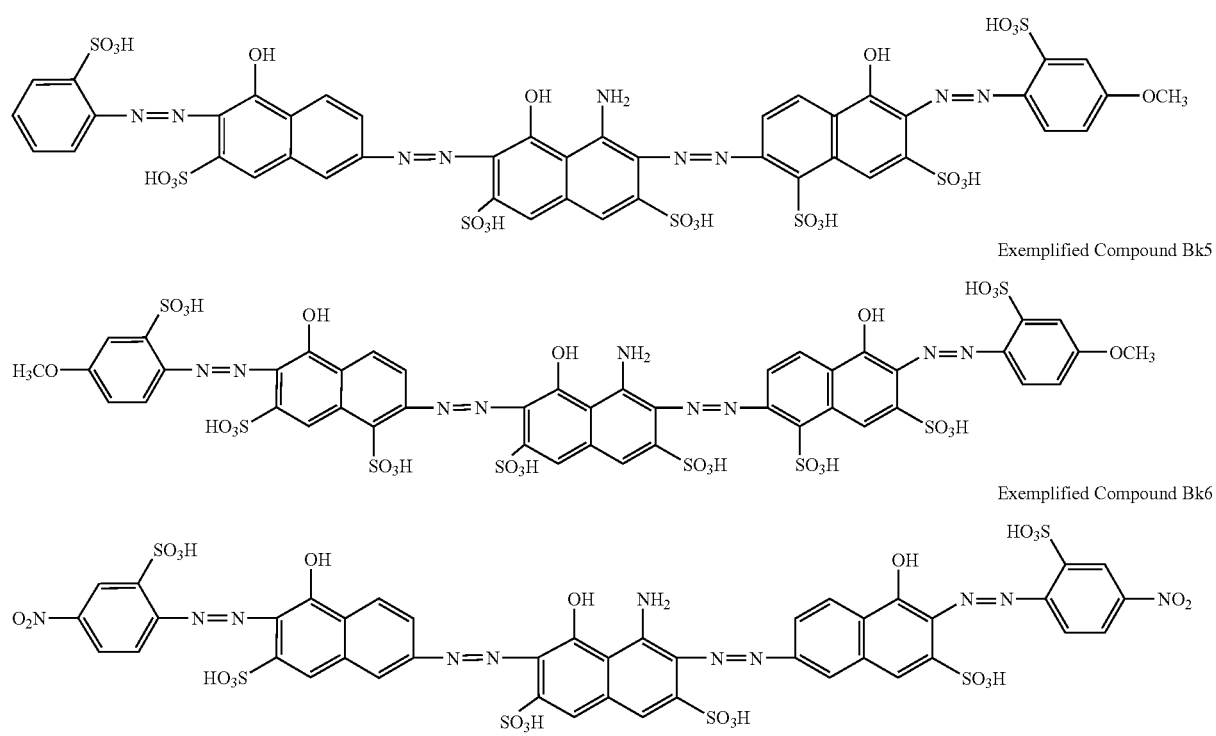

Exemplified Compound Bk4

Exemplified Compound Bk5

Exemplified Compound Bk6

<Water-soluble Organic Solvent and Additive>

The ink according to the present invention is obtained by dissolving or dispersing any one of the above-mentioned colorants in an aqueous medium. A mixed medium of water and a water-soluble organic solvent is preferably used as the aqueous medium. At this time, there is no particular limitation on what water-soluble organic solvent is incorporated. Any one of various water-soluble organic solvents can be arbitrarily used. The water-soluble organic solvents are not particularly limited as long as they are water-soluble, and examples thereof include an alcohol, a polyhydric alcohol, a polyglycol, a glycol ether, a nitrogen-containing polar solvent, and a sulfur-containing polar solvent. Examples of a water-soluble organic solvent that can be used for the ink of the present invention are shown below, but the present invention is not limited to these water-soluble organic solvents.

Specific examples of the water-soluble organic solvents include: alkyl alcohols each having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols in each of which an alkylene group has 2 to 6 carbon atoms such as ethylene glycol, propylene glycol, butylene glycol, triethylene glycol, 1,2,6-hexane triol, thio diglycol, hexylene glycol, and diethylene glycol; lower alkyl ether acetates such as polyethylene glycol monomethyl ether acetate; lower alkyl ethers of polyhydric alcohols such as ethylene glycol monomethyl (or ethyl) ether, diethylene glycol methyl (or ethyl) ether, and triethylene glycol monomethyl (or ethyl) ether; polyhydric alcohols such as trimethylolpropane and trimethylolethane; glycerin; N-methyl-2-pyrrolidone; 2-pyrrolidone; and 1,3-dimethyl-2-imidazolidinone. Each of the water-soluble organic solvents as described above may be used alone, or two or more of them may be used as a mixture.

In addition, the ink may optionally contain various additives such as a surfactant, a pH adjustor, a rust inhibitor, an antiseptic, a mildewproofing agent, an antioxidant, an antireducing agent, an evaporation accelerator, a chelating agent, and a water-soluble polymer.

(Ink Cartridge)

Next, an embodiment of the present invention will be described with reference to the drawings. It should be noted that the attached drawings which are incorporated herein and form part hereof show several aspects of the present invention, and are subjected to use for explaining the rule and principle of the present invention in combination with the description. FIGS. 2 to 7 are each an explanatory view for explaining a suitable recording head in or to which the present invention is practiced or applied. Hereinafter, each component will be described with reference to those drawings.

Figure 2:
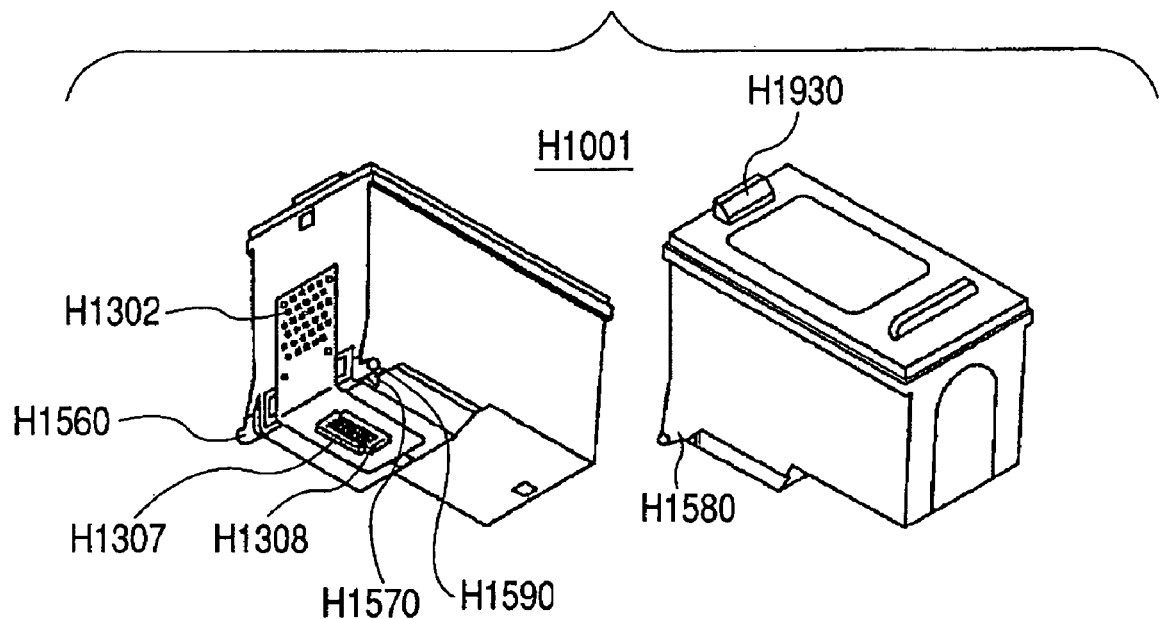
FIG. 2 is a perspective view of a recording head (i.e., ink cartridge).
Figure 3:
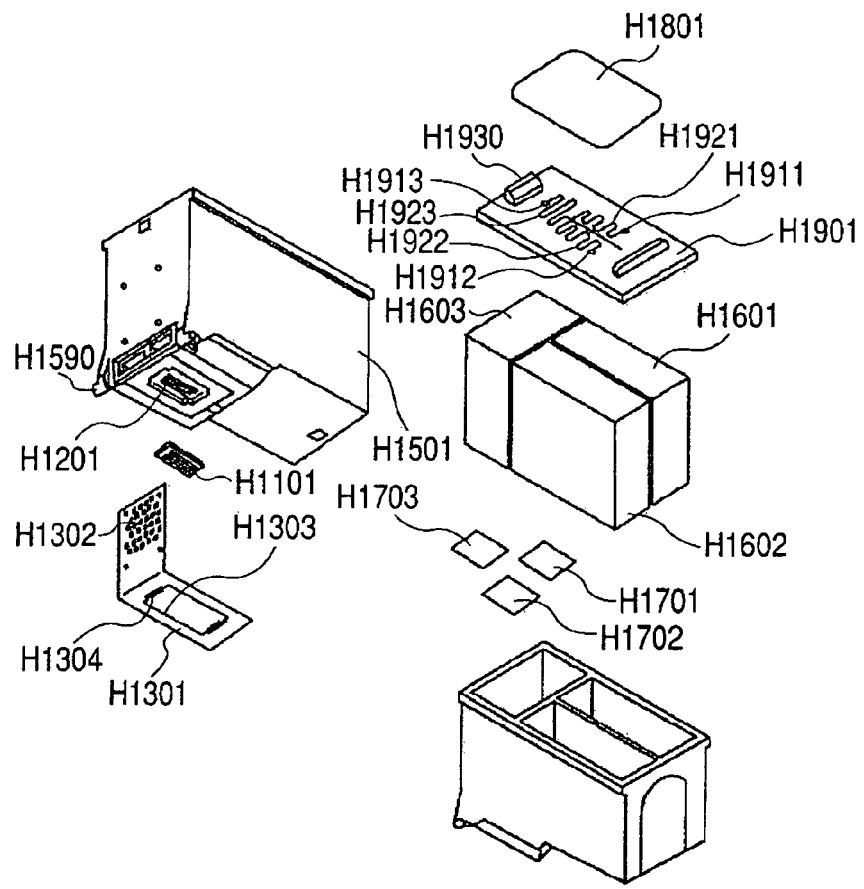
FIG. 3 is an exploded view of the recording head (i.e., ink cartridge).

As shown in each of FIGS. 2 and 3, a recording head (i.e., ink cartridge) of the present invention is constituted in such a manner that the head and an ink tank are integrated with each other. A recording head (i.e., ink cartridge) H1001 in each of FIGS. 2 and 3 is mounted with three color inks: a cyan ink, a magenta ink, and a yellow ink. The recording head H1001 is fixed and supported by means for positioning a carriage mounted on the main body of an ink-jet recording apparatus and by an electrical contact, and is detachable from the carriage. Each of the inks mounted on the head is exchanged after having been consumed.

Next, the respective components of which the recording head (i.e., ink cartridge) is constituted will be sequentially described in more detail.

(Recording head (i.e., ink cartridge))

The recording head (i.e., ink cartridge) H1001 in this example is a recording head according to a bubble jet (registered trademark) mode using an electrothermal transducer that generates thermal energy for causing the film boiling of ink in accordance with an electrical signal. The recording head is a so-called side-shooter type recording head in which an electrothermal transducer and an ink ejection opening are arranged so as to be opposite to each other. In the present invention, the head preferably has a nozzle train in which 150 or more nozzles are arranged at a pitch interval of 300 dpi or more and the amount of ink to be ejected from each nozzle is 30 pl or less from the viewpoints of the outputting of a high-quality image to plain paper and high-speed printing. Further, from the viewpoint of compatibility between photograph picture quality and high-speed printing, the head preferably has a nozzle train in which 100 or more nozzles from each of which ink is ejected in an amount of 6 pl or less are arranged at a pitch interval of 600 dpi or more.

(1-1) Recording Head (i.e., Ink Cartridge)

The recording head (i.e., ink cartridge) H1001 is used for ejecting the three color inks, that is, the cyan, magenta, and yellow inks. As shown in the exploded perspective view of FIG. 3, the head includes a recording element substrate H1101, an electric wiring tape H1301, and an ink supplying/holding member H1501. The head further includes filters H1701, H1702, and H1703, ink absorption members H1601, H1602, and H1603, a lid member H1901, and a sealing member H1801.

(1-1-1) Recording Element Substrate

Figure 4:
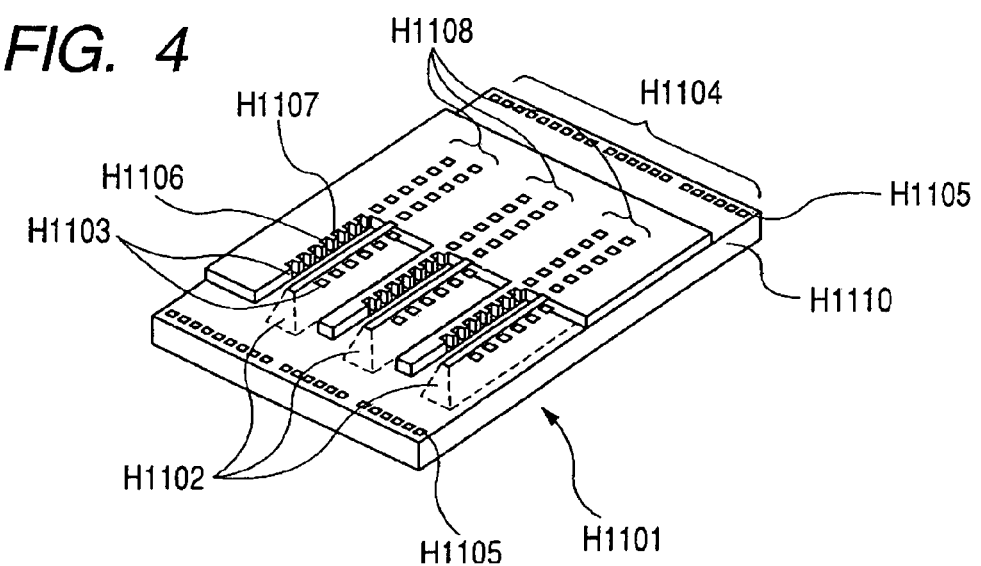
FIG. 4 is a partially cut perspective view of a recording element substrate.
Figure 7:
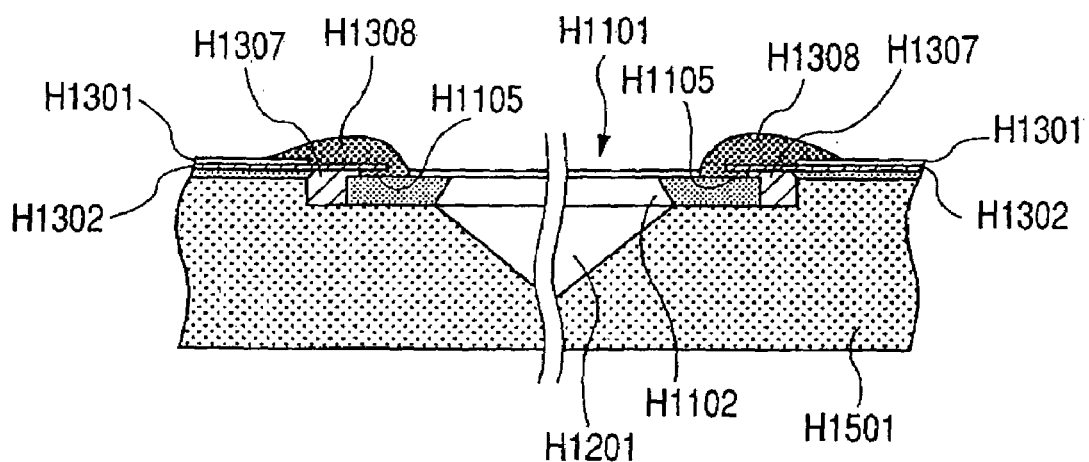
FIG. 7 is a sectional view of part of the recording head (i.e., ink cartridge).

FIG. 4 is a partially cut perspective view for explaining the constitution of the recording element substrate H1101. Three ink supply openings H1102 for three inks, that is, cyan, magenta, and yellow inks are formed in parallel with one another. Electrothermal transducers H1103 placed in a line and ejection openings H1107 placed in a line are arranged and formed in a zigzag fashion on both sides of each of the ink supply openings H1102 so that the ink supply openings are sandwiched between the line of the electrothermal transducers and the line of the ejection openings. In addition, electric wiring, a fuse, electrode portions H1104, and the like are formed on a silicon substrate H1110. Ink flow path walls H1106 and the ejection openings H1107 are each formed of a resin material on the resultant by means of a photolithography technique. Bumps H1105 each made of Au or the like are formed in the electrode portions H1104 for supplying power to the electric wiring.

(1-1-2) Nozzle Structure

FIGS. 5A and 5B are each a view schematically showing a nozzle part provided for an ink-jet head to which the ink according to the present invention is applied. FIG. 5A is a view showing the shape of a nozzle when the nozzle is seen from its ejection opening side. FIG. 5B is a view showing a cross section taken along the broken line X-Y of FIG. 5A. In FIG. 5B, reference symbol H2101 represents a silicon substrate and reference symbol H2102 represents a heat accumulation layer composed of a thermal oxidation layer. In addition, reference symbol H2103 represents an interlayer layer which also serves to accumulate heat and is composed of, for example, a silicon oxide layer or a silicon nitride layer, reference symbol H2104 represents a heating resistor layer, and reference symbol H2105 represents a metal wiring layer as wiring composed of a metal material such as Al, Al—Si, or Al—Cu. In addition, reference symbol H2106 represents a protective layer which is composed of, for example, a silicon oxide layer, a silicon nitride layer, or a silicon carbide layer and functions as an insulating layer. Of those, the protective layer H2106 directly contacts with the ink, so the layer is requested to be chemically stable against, for example, an alkali, and to have sufficient resistance against a physical shock, and the necessity for the layer to be provided with electrical insulating property is great. Accordingly, a silicon nitride layer or a silicon carbide layer can be particularly suitably used as a material of which the layer is formed. In addition, reference symbol H2107 represents a heat generating portion, and heat generated in the heat resistive element of the heating resistor layer H2104 acts on the ink.

The heat generating portion H2107 in the ink-jet head is a part which: is exposed to high temperature owing to the generation of heat in the heat element; and mainly receives a cavitation impact or a chemical action by the ink in association with the foaming of the ink and the contraction of foam after the foaming. Accordingly, the heat generating portion H2107 is provided with the protective layer H2106 for protecting an electrothermal transducer from the cavitation impact and the chemical action by the ink. The thickness of the protective layer H2106 is preferably in the range of from 50 nm to 500 nm from the viewpoints of: thermal conversion efficiency that is important in the efficient conversion of an electrical pulse to be applied to the heat resistive element; and the protection of the electrothermal transducer from a physical shock and chemical corrosion caused by the ink in association with a foaming phenomenon.

That is, when the thickness is less than 50 nm, the ejection durability of the heat generating portion may be insufficient, or a fluctuation in energy to be inputted may be sensitively susceptible to a change in thickness due to the dissolution of the protective layer due to storage. On the other hand, when the thickness exceeds 500 nm, foaming requires large energy, and, in the case where nozzles are arranged at a high density and the frequency at which ink is ejected is increased, the temperature of a nozzle tends to be likely to increase. Further, in the present invention, the thickness of the protective layer is particularly preferably in the range of from 100 nm or more to 450 nm or less in order that the number of nozzles may additionally increase, the density at which the nozzles are arranged may additionally increase, and the ejection durability of the heat generating portion may additionally improve. An ejection element provided with an ejection opening H2109 for ejecting ink is formed by using a flow path forming member H2108 on the protective layer H2106.

A diagonal line portion H2110 of each of FIGS. 5A and 5B is a liquid chamber part of a nozzle portion to be filled with ink. The ink is supplied from a common liquid chamber H2111 arranged on the right side of the nozzle portion. After having foamed in the heat generating portion H2107 to form foam, the ink is extruded from the ejection opening H2109, and is ejected in the form of an ink droplet.

(1-1-3) Electric Wiring Tape

The electric wiring tape H1301 forms an electrical signal path for applying, to the recording element substrate H1101, an electrical signal for ejecting ink, and an opening into which the recording element substrate is to be incorporated is formed in the tape. Electrode terminals H1304 to be connected to the electrode portions H1104 of the recording element substrate are formed near the edges of the opening. In addition, external signal input terminals H1302 for receiving electrical signals from the main body of the apparatus are formed in the electric wiring tape H1301. The electrode terminals H1304 and the external signal input terminals H1302 are connected by a continuous copper foil wiring pattern.

The electric wiring tape H1301 and the second recording element substrate H1101 are electrically connected by electrically joining the bumps H1105 and the electrode terminals H1304 by a thermal ultrasonic contact bonding method. The bumps H1105 are formed in the electrode portions H1104 of the second recording element substrate H1101, and the electrode terminals H1304 are formed in the electric wiring tape H1301 corresponding to the electrode portions H1104 of the second recording element substrate H1101.

(1-1-4) Ink Supplying/holding Member

The ink supplying/holding member H1501 is formed by molding a resin, and a thermoplastic resin material that can be molded by, for example, injection molding, compression molding, or heat forming can be suitably used as a component of the member. Examples of an appropriate thermoplastic resin preferably include, but not limited to, polyester, polycarbonate, polypropylene, polyethylene, polystyrene, and polyphenylene ether, and mixtures and modified products of them. Of those, polyphenylene ether is preferable, and an alloy of polyphenylene ether and a styrene-based material is particularly preferable. Polyphenylene ether, and an alloy of polyphenylene ether and a styrene-based material are each extremely preferably used in an ink cartridge like the present invention because each of them is excellent in moldability and heat resisting property. In addition, each of those materials has relatively high permeability to gases, so the present invention acts extremely effectively. A thermoplastic resin material mixed with 5 to 40 mass % of a filler is preferably used as a resin material from the viewpoints of an improvement in rigidity of shape and the suppression of permeability to gases. Examples of a filler preferably include, but not limited to, inorganic substances such as glass, silica, and graphite (i.e., black lead). High levels of ink resistance and welding property are required, and, in the case where a recording head is directly implemented on the ink supplying/holding member like this embodiment, high levels of, for example, adhesiveness with an adhesive and linear expansibility due to heat are also required. A resin material obtained by mixing an alloy of polyphenylene ether and a styrene-based material with a filler is particularly preferable from the viewpoint of a balance among those required properties.

As shown in FIG. 3, the ink supplying/holding member H1501 has spaces each intended to hold independently any one of the absorption members H1601, H1602, and H1603 for generating negative pressures for holding the cyan, magenta, and yellow inks in the absorption members H1601, H1602, and H1603, respectively. The ink supplying/holding member H1501 is further provided with an ink supplying function of forming independent ink flow paths for guiding inks to the respective ink supply openings H1102 of the recording element substrate H1101. Each of the ink absorption members H1601, H1602, and H1603, which is preferably obtained by compressing a polypropylene (PP) fiber, may be obtained by compressing a urethane fiber. Boundary portions of the upstream portions of the respective ink flow paths with the ink absorption members H1601, H1602, and H1603 are joined by welding to the filters H1701, H1702, and H1703 for preventing the penetration of dust into the recording element substrate H1101, respectively. Each of the filters H1701, H1702, and H1703, which may be of an SUS metal mesh type, is preferably of an SUS metal fiber sintered type.

In addition, in the present invention, the ink supplying/holding member is preferably shaped in such a manner that the respective liquid chambers have substantially the same area of a surface in which ink can evaporate as shown in FIG. 3. This is because, as a result of the shaping, the amounts of evaporation of the inks of the respective liquid chambers can be uniformized to some extent and the inks tend to evaporate uniformly. To be specific, a difference between the maximum value and the minimum value for ratios $\beta/\alpha$ where $\beta$ represents the area of a surface in which the ink of each of the liquid chambers of which an ink cartridge is constituted can evaporate in a unit of $cm^2$ and $\alpha$ represents the volume of each of the liquid chambers in a unit of $cm^3$ is preferably 0.5 or less. The term "surface in which ink can evaporate" refers to such a surface that ink can evaporate after permeating a member present between the ink and the atmosphere. For example, the external wall surface of the ink-jet cartridge of FIG. 3 is a surface in which ink can evaporate, but a surface between an ink liquid chamber and an adjacent ink liquid chamber is not a surface in which ink can evaporate because the evaporation of an ink is inhibited by an adjacent ink. In addition, in the case of, for example, an ink cartridge storing three color inks, a preferable liquid chamber arrangement is specifically such that liquid chambers are separated by T lines as shown in FIG. 3 because the liquid chambers can be easily arranged in such a manner that the balance of any one of the liquid chambers between the volume $\alpha$ of the liquid chamber and the area $\beta$ of a surface in which ink can evaporate and the balance of any one of the other liquid chambers between the volume a and the area $\beta$ are uniform.

Ink supply openings H1201 for supplying the respective inks, that is, the cyan, magenta, and yellow inks to the recording element substrate H1101 are formed in the downstream portions of the ink flow paths. The recording element substrate H1101 is bonded and fixed to the ink supplying/holding member H1501 with high accuracy of position in such a manner that each of the ink supply openings H1102 of the recording element substrate H1101 is in communication with each of the ink supply openings H1201 of the ink supplying/holding member H1501. A first adhesive to be used in the bonding is preferably one which: has a low viscosity and a low curing temperature; cures in a short period of time; has relatively high hardness after curing; and has ink resistance. For example, a thermosetting adhesive mainly composed of an epoxy resin is used as the first adhesive, and the thickness of an adhesive layer at that time is preferably about 50 µm.

Part of the rear surface of the electric wiring tape H1301 is bonded and fixed to a flat surface around the ink supply openings H1201 by using a second adhesive. The part where the second recording element substrate H1101 and the electric wiring tape H1301 are electrically connected to each other is sealed with a first sealing compound H1307 and a second sealing compound H1308 (see FIG. 7) so that the part where they are electrically connected to each other is protected from corrosion by ink and an external impact. The first sealing compound H1307 seals mainly the rear surface side of the portion where any one of the external signal input terminals H1302 of the electric wiring tape H1301 and any one of the bumps H1105 of the recording element substrate are connected and the outer peripheral part of the recording element substrate. The second sealing compound H1308 seals the front surface side of the above-mentioned portion where any one of the external signal input terminals H1302 and any one of the bumps H1105 are connected. In addition, an unbounded portion of the electric wiring tape H1301 is bent, and is fixed to a side surface substantially perpendicular to the surface of the ink supplying/holding member H1501 having the ink supply openings H1201 by, for example, heat caulking or bonding.

(1-1-5) Lid Member

The lid member H1901 is welded to the upper opening of the ink supplying/holding member H1501, whereby the member respectively closes the independent spaces inside the ink supplying/holding member H1501. It should be noted that the lid member H1901 has fine openings H1911, H1912, and H1913 for letting pressure fluctuations of the respective chambers inside the ink supplying/holding member H1501 escape, and fine grooves H1921, H1922, and H1923 in communication with the respective openings. Other ends of the fine grooves H1921 and H1922 merge with some midpoint in the fine groove H1923. Further, the sealing member H1801 covers the fine openings H1911, H1912, and H1913, the fine grooves H1921 and H1922, and most part of the fine groove H1923, and the other end portion of the fine groove H1923 is opened, whereby an air vent is formed. The formation of such air vent with a labyrinth structure is preferable because the formation can effectively suppress the evaporation of an ink volatile component from the air vent. In addition, the lid member H1901 has an engaging portion H1930 for fixing the recording head to an ink-jet recording apparatus.

A resin material mixed with a filler similar to that of the ink supplying/holding member can be also suitably used in the lid member. Even when the above-mentioned resin material is used in each of the ink supplying/holding member and the lid member, the permeation of moisture from the resin material itself cannot be avoided. Accordingly, some degree of ink evaporation occurs even when the above-mentioned air vent with a labyrinth structure is provided.

(1-2) Mounting of Recording Head (i.e., Ink Cartridge) on Ink-jet Recording Apparatus As shown in FIG. 2, the recording head H1001 includes: a mounting guide H1560 for guiding the head to the position at which the head is mounted on the carriage of the main body of the ink-jet recording apparatus; and the engaging portion H1930 for mounting and fixing the head on and to the carriage by using a head set lever. The head further includes an abutting portion H1570 in an X direction (i.e., carriage scan direction), an abutting portion H1580 in a Y direction (i.e., recording medium conveying direction), and an abutting portion H1590 in a Z direction (i.e., ink ejection direction), for positioning the head at the predetermined position at which the head is mounted on the carriage. The head is positioned by the above-mentioned abutting portions, whereby the external signal input terminals H1302 on the electric wiring tapes H1300 and H1301 electrically contact with contact pins as electrical connection portions provided for the inside of the carriage in an accurate manner.

(1-3) Method of Driving Recording Head

When a pulse-like electrical signal is applied to the metal wiring layer H2105 of the head shown in FIGS. 5A and 5B, the heat generating portion H2107 of the heating element substrate H2104 abruptly generates heat, and foam is generated in ink in contact with the surface of the heat generating portion. The pressure of the foam causes a meniscus to protrude. Then, the ink is ejected through the ejection opening H2109 of the head to become a small ink droplet, and the droplet flies to a recording medium.

(Ink-jet Recording Apparatus)

Figure 8:
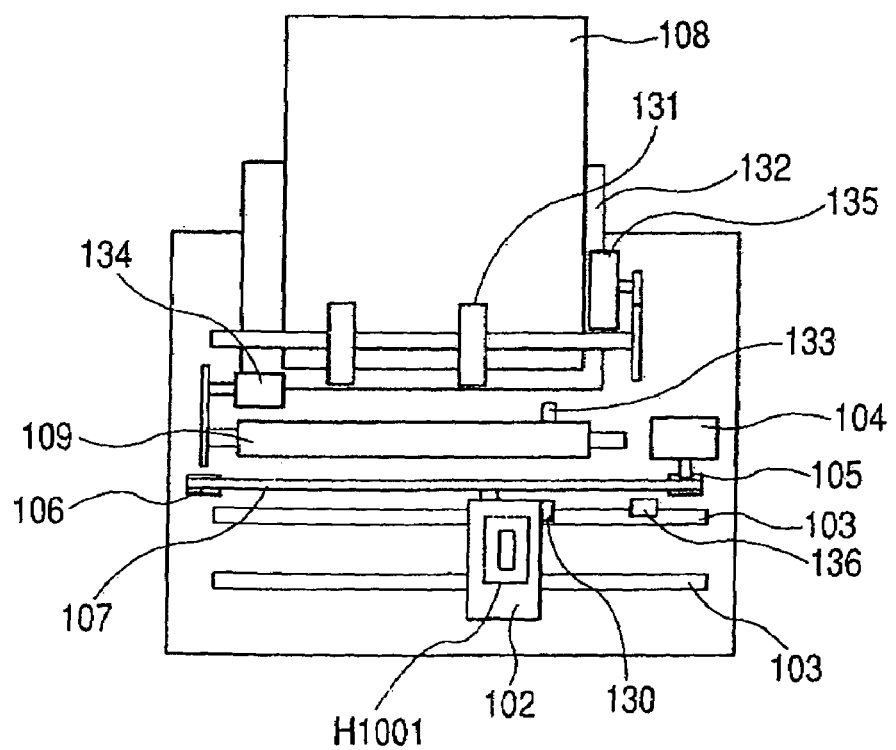
FIG. 8 is a view showing an ink-jet recording apparatus.
Figure 9:
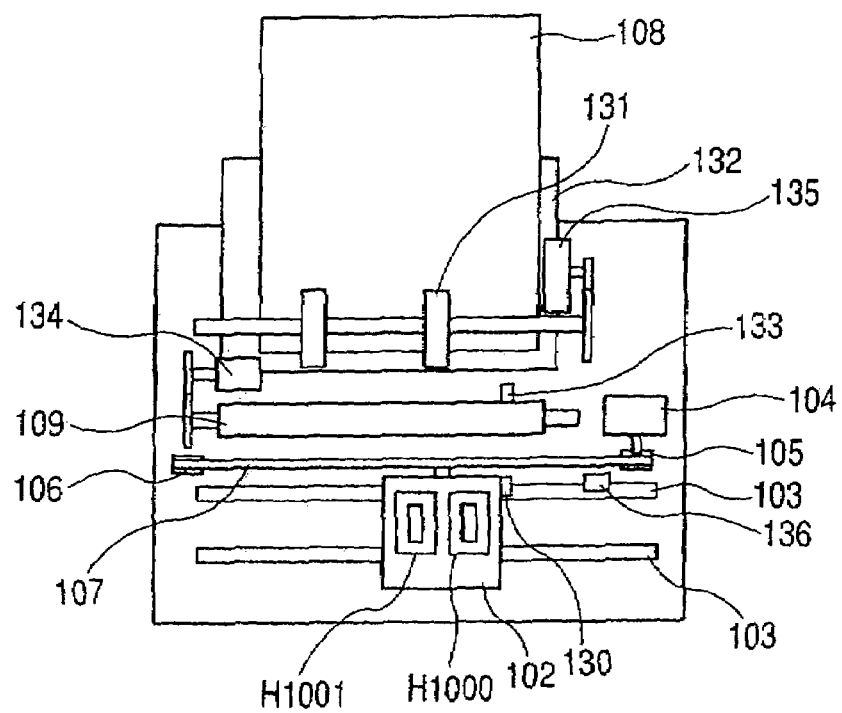
FIG. 9 is a view showing an ink-jet recording apparatus.

Next, a liquid ejection recording apparatus on which the recording head of a cartridge type as described above can be mounted will be described. FIG. 8 is an explanatory view showing an example of a recording apparatus on which the liquid ejection recording head of the present invention can be mounted. In the recording apparatus shown in FIG. 8, the recording head H1001 shown in FIG. 2 is positioned and mounted on a carriage 102 so as to be detachable from the carriage, and the carriage 102 is provided with electrical connection portions for transferring a drive signal and the like to the respective ejection portions through the external signal input terminals on the recording head H1001. FIG. 9 is an explanatory view showing an example of a recording apparatus on which a liquid ejection recording head of the present invention can be mounted. The recording apparatus shown in FIG. 9 is identical to the recording apparatus shown in FIG. 8 except that the recording apparatus shown in FIG. 9 includes the two recording heads H1000 and H1001.

The carriage 102 is reciprocatably guided and supported along a guide shaft 103 installed in the apparatus main body to extend in a main scanning direction. In addition, the carriage 102 is driven by a main scanning motor 104 via driving mechanisms such as a motor pulley 105, a driven pulley 106, and a timing belt 107, and, at the same time, its position and movement are controlled. In addition, the carriage 102 is provided with a home position sensor 130. With this constitution, the position of the carriage can be known when the home position sensor 130 on the carriage 102 passes the position of a shielding plate 136.

Recording media 108 such as printing paper or plastic thin plates are separately fed one by one from an automatic sheet feeder (ASF) 132 by rotating a pickup roller 131 from a sheet feeding motor 135 via a gear. Further, each of the media is conveyed (i.e., sub-scanned) through a position (i.e., print portion) opposite to the ejection opening surface of the recording heads H1000 and H1001 by the rotation of a transport roller 109. The transport roller 109 is rotated by the rotation of an LF motor 134 via a gear. At that time, judgement whether a medium was fed and the determination of a heading position upon sheet feeding are performed when each of the recording media 108 passes a paper end sensor 133. Further, the paper end sensor 133 is used to find the position where the rear end of each of the recording media 108 is actually placed and to finally identify a current recording position from the actual rear end as well.

It should be noted that the rear surface of each of the recording media 108 is supported by a platen (not shown) in order that a flat print surface may be formed in the print portion. In this case, the recording head H1001 mounted on the carriage 102 is held in such a manner that the ejection opening surface of the recording head H1001 protrudes downward from the carriage 102 and is in parallel with each of the recording media 108 between the two pairs of transport rollers as mentioned above. The recording head H1001 is mounted on the carriage 102 in such a manner that the directions in each of which ejection openings are arranged in each ejection portion (i.e., ejection opening trains) intersect the above-mentioned scanning direction of the carriage 102, and recording is performed by ejecting a liquid from those ejection opening trains.

EXAMPLES

Hereinafter, the present invention will be described more specifically by way of examples and comparative examples. However, the present invention is not limited by the following examples as long as the present invention does not depart from its gist. It should be noted that the terms "part(s)" and "%" in the following description represent "part(s) by mass" and "mass %", respectively, unless otherwise stated.

<Production of Colorant>

(Cyan Dye 1)

Sulfolane, a 4-sulfophthalic acid monosodium salt, ammonium chloride, urea, ammonium molybdate, and cupric chloride were stirred and washed with methanol. After that, water was added to the mixture, and the pH of the resultant liquid was adjusted to 11 by using an aqueous solution of sodium hydroxide. Next, an aqueous solution of hydrochloric acid was added to the liquid while the liquid was stirred, and then sodium chloride was gradually added to the mixture. Then, a precipitated crystal was filtered and washed with a 20% aqueous solution of sodium chloride. Subsequently, methanol was added, and the precipitated crystal was separated by filtration. Further, the crystal was washed with a 70% aqueous solution of methanol, and was then dried, whereby a copper phthalocyanine tetrasulfonic acid tetrasodium salt as a blue crystal was obtained.

Next, the copper phthalocyanine tetrasulfonic acid tetrasodium salt obtained in the foregoing was gradually added to chlorosulfonic acid, and then thionyl chloride was dropped to the mixture. A reaction liquid was cooled and a precipitated crystal was filtered, whereby a desired wet cake of copper phthalocyanine tetrasulfonic acid chloride was obtained. The wet cake was stirred and suspended, and ammonia water and a compound of the following formula (α) were added to the cake. Further, water and sodium chloride were added to the resultant, whereby a crystal was precipitated. The precipitated crystal was filtered and washed with an aqueous solution of sodium chloride. The crystal was filtered and washed again, and was then dried, whereby a colorant to be used in examples, that is, Cyan Dye 1 was obtained.

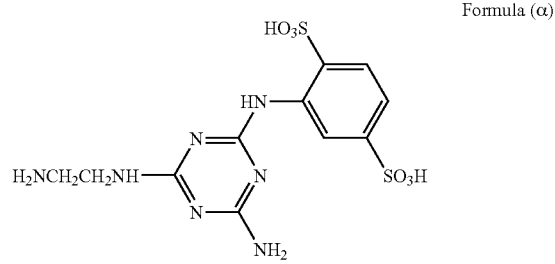

Formula (α)

The compound represented by the formula (α) was synthesized as described below. Lipal OH, cyanuric chloride, and an aniline-2,5-disulfonic acid monosodium salt were loaded into ice water. Next, a reaction liquid was added with an aqueous solution of sodium hydroxide, and its pH was adjusted to 10.0. 28% ammonia water and ethylenediamine were added to the reaction liquid. Subsequently, sodium chloride and concentrated hydrochloric acid were dropped to the resultant, whereby a crystal was precipitated. The precipitated crystal was filtered and fractionated, and was washed with a 20% aqueous solution of sodium chloride, whereby a wet cake was obtained. Methanol and water were added to the resultant wet cake, and the whole was filtered, washed with methanol, and dried, whereby the compound represented by the formula (α) was obtained:

where l=0 to 2, m=1 to 3, and n=1 to 3 provided that l+m+n=3 or 4 and m≧1, the substitution position of a substituent is 4- or 4'-position, and M represents Na.

(Magenta Dye 1)

A compound represented by the following formula (γ), sodium carbonate, and benzoyl ethyl acetate ester were reacted with one another in xylene, and a reactant was filtered and washed. The resultant was reacted in N,N-dimethylformamide with meta-amino acetanilide, copper acetate, and sodium carbonate sequentially added, and a reactant was filtered and washed. Further, the resultant was sulfonated in fuming sulfuric acid, filtered, and washed. The resultant was subjected to a condensation reaction with cyanuric chloride in the presence of sodium hydroxide. Anthranilic acid was added to the reaction liquid, and the whole was subjected to a condensation reaction in the presence of sodium hydroxide. The resultant was filtered and washed, whereby a colorant to be used in examples, that is, Magenta Dye 1 represented by the following formula was obtained.

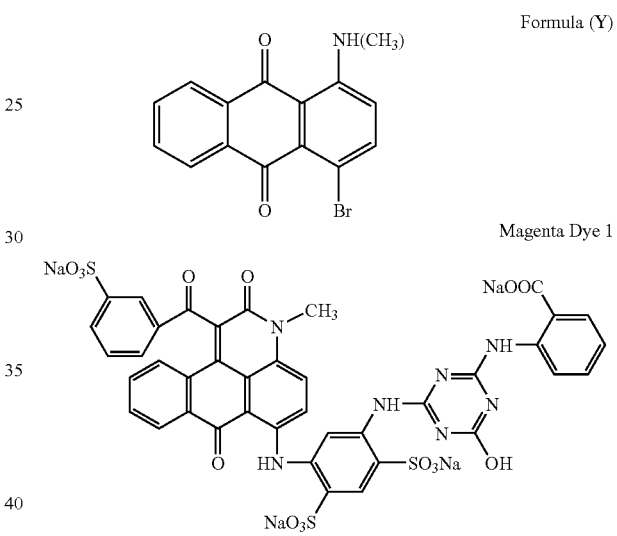

<Preparation of Inks>
(Production of Inks Y1, C1, and M1)
Various components shown in Table 2 including a dye obtained in the foregoing were added in predetermined amounts shown in the table 2, and water was used to adjust the

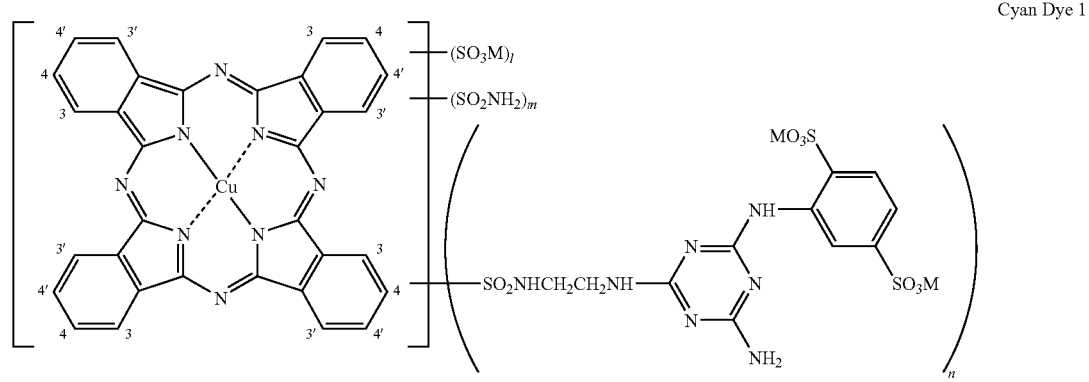

Cyan Dye 1 total amount of the components and water to 100 parts, whereby an ink was produced. That is, the respective components shown in Table 2 were mixed and sufficiently stirred for dissolution. After that, the resultant was filtered through a microfilter having a pore size of 0.2 μm (manufactured by Fuji Photo Film Co., Ltd.) under pressure, whereby each of a cyan ink (C1), a yellow ink (Y1), and a magenta ink (M1) was prepared. Then, the ink density under an environment of 25° C. of each of: the ink before evaporation (hereinafter referred to as "ink in an initial state") of each of those three kinds of inks; and inks each obtained by evaporating each of those three kinds of inks by 10 mass % and 15 mass % (hereinafter referred to as "ink corresponding to 10% evaporation" and "ink corresponding to 15% evaporation", respectively) was measured by using a standard densimeter. Table 2 shows the results of the measurement as well. It should be noted that an operation for evaporating an ink with a view to obtaining, for example, an ink corresponding to 10% evaporation was performed by holding the ink in a constant-temperature, constant-humidity state having a temperature of 30° C. and a humidity of 10%.

TABLE 2

Composition and ink properties of each ink (unit: parts)

| | C1 | Y1 | M1 |
|---|---|---|---|
| Glycerin | 5 | 8 | 4 |
| Ethylene glycol | 7 | 8 | 8 |
| 2-pyrrolidone | 4 | 4 | 5 |
| 1,5-pentanediol | 5 | — | 5 |
| Ethylene urea | 5 | 5 | 5 |
| Acetylenol E100 | 0.8 | 0.8 | 0.8 |
| Dye  Cyan Dye 1 | 6 | — | — |
| C.I. Direct Yellow 132 | — | 3 | — |
| Magenta Dye 1 | — | — | 6 |
| Water | Balance | Balance | Balance |
| Ink density (g/ml) | | | |
| A: Ink in initial state | 1.062 | 1.056 | 1.066 |
| B10: Ink corresponding to 10% evaporation | 1.070 | 1.062 | 1.072 |
| B15: Ink corresponding to 15% evaporation | 1.073 | 1.064 | 1.075 |
| Difference between density in initial state and density after 10% evaporation (B10-A) | 0.008 | 0.006 | 0.006 |
| Difference between density in initial state and density after 15% evaporation (B15-A) | 0.011 | 0.008 | 0.009 |

(Production of Inks M2 to M6)

In addition, magenta inks (M2 to M6) having ink densities shown in Table 3 were each produced in the same manner as that of Ink M1 produced in the foregoing except that the amounts of ethylene urea, 1,5-pentanediol, and water of Ink M1 were adjusted. Further, the ink density of each of an ink in an initial state, an ink corresponding to 10% evaporation, and an ink corresponding to 15% evaporation was measured for each of the resultant five kinds of inks in the same manner as that described above. Table 3 shows the results of the measurement as well. As is apparent from Table 3, all the inks each had an initial ink density higher than those of Inks C1 and Y1.

TABLE 3

Ink properties of each ink

| | M2 | M3 | M4 | M5 | M6 |
|---|---|---|---|---|---|
| Ink density (g/ml) | | | | | |
| A: Ink in initial state | 1.070 | 1.088 | 1.102 | 1.141 | 1.146 |
| B10: Ink corresponding to 10% evaporation | 1.079 | 1.096 | 1.117 | 1.158 | 1.172 |
| B15: Ink corresponding to 15% evaporation | 1.087 | 1.108 | 1.128 | 1.171 | 1.185 |
| Difference between density in initial state and density after 10% evaporation (B10-A) | 0.009 | 0.008 | 0.015 | 0.017 | 0.026 |
| Difference between density in initial state and density after 15% evaporation (B15-A) | 0.017 | 0.020 | 0.026 | 0.030 | 0.039 |

Examples 1 to 5 and Comparative Example 1

Cyan Ink C1, Yellow Ink Y1, and Magenta Ink M1 shown in Table 2, and Cyan Ink C1 and Yellow Ink Y1 shown in Table 2 and Magenta Inks M2 to M6 shown in Table 3 were combined as shown in Table 4, whereby Ink Sets 1 to 6 were produced. Then, each of the resultant ink sets was stored in the ink cartridge shown in each of FIGS. 2 and 3, whereby ink cartridges of Examples 1 to 5 and Comparative Example 1 were produced. The resultant ink cartridges each storing an ink in an initial state were defined as Ink Cartridges 1 to 6.

A magenta ink corresponding to 10% evaporation was produced by evaporating each magenta ink of which each of the ink sets used in the foregoing was constituted at an evaporation rate of 10% in consideration of the case where only a magenta ink in each of the ink sets evaporated. Then, an ink set was produced by combining each magenta ink corresponding to 10% evaporation, a cyan ink, and a yellow ink as shown in Table 4. Each of the resultant ink sets was stored in the ink cartridge shown in each of FIGS. 2 and 3 in the same manner as that described above, whereby ink cartridges of Examples 1 to 5 and Comparative Example 1 were produced. Those ink cartridges each storing a magenta ink corresponding to 10% evaporation were defined as Ink Cartridges 7 to 12.

A magenta ink corresponding to 15% evaporation was produced by evaporating each magenta ink of which each of the ink sets used in the foregoing was constituted at an evaporation rate of 15% in consideration of the case where only a magenta ink in each of the ink sets evaporated. Then, an ink set was produced by combining each magenta ink corresponding to 15% evaporation, a cyan ink, and a yellow ink as shown in Table 4. Each of the resultant ink sets was stored in the ink cartridge shown in each of FIGS. 2 and 3 in the same manner as that described above, whereby ink cartridges of Examples 1 to 5 and Comparative Example 1 were produced. Those ink cartridges each storing a magenta ink corresponding to 15% evaporation were defined as Ink Cartridges 13 to 18.

In addition, all ink supplying/holding bodies (ink cartridge casings) are each constituted of a material formed of a resin obtained by incorporating 35% of a filler into an alloy of a styrene-based material and polyphenylene ether, and a material for an ink absorption member is polypropylene. The ink absorption member is sealed with a lid forming material having an air vent with a labyrinth structure as shown in each of FIGS. 2 and 3.

TABLE 4

Constitution of each of Ink Cartridges 1 to 18

|  |  | Example 1 | Example 2 | Example 3 | Example 4 | Example 5 | Comparative Example 1 |
|---|---|---|---|---|---|---|---|
| Ink cartridge No. | | 1 | 2 | 3 | 4 | 5 | 6 |
| Stored inks | Cyan ink | C1 | C1 | C1 | C1 | C1 | C1 |
| | Yellow ink | Y1 | Y1 | Y1 | Y1 | Y1 | Y1 |
| | Magenta ink | M1 | M2 | M3 | M4 | M5 | M6 |
| Ink cartridge No. | | 7 | 8 | 9 | 10 | 11 | 12 |
| Stored inks | Cyan ink | C1 | C1 | C1 | C1 | C1 | C1 |
| | Yellow ink | Y1 | Y1 | Y1 | Y1 | Y1 | Y1 |
| | Magenta ink corresponding to 10% evaporation | M1 | M2 | M3 | M4 | M5 | M6 |
| Ink cartridge No. | | 13 | 14 | 15 | 16 | 17 | 18 |
| Stored inks | Cyan ink | C1 | C1 | C1 | C1 | C1 | C1 |
| | Yellow ink | Y1 | Y1 | Y1 | Y1 | Y1 | Y1 |
| | Magenta ink corresponding to 15% evaporation | M1 | M2 | M3 | M4 | M5 | M6 |
| Ink density (g/ml) | | | | | | | |
| A1: Minimum value for initial densities | | 1.056 | 1.056 | 1.056 | 1.056 | 1.056 | 1.056 |
| B1: Maximum value for densities after 10% evaporation | | 1.072 | 1.079 | 1.096 | 1.117 | 1.158 | 1.172 |
| B2: Maximum value for densities after 15% evaporation | | 1.075 | 1.087 | 1.108 | 1.128 | 1.171 | 1.185 |
| (B1 − A1)/A1 | | 0.015 | 0.022 | 0.038 | 0.058 | 0.097 | 0.110 |
| (B2 − A1)/A1 | | 0.018 | 0.029 | 0.049 | 0.068 | 0.109 | 0.122 |

(Evaluation)

100% solid patch images and gradation images of cyan, magenta, yellow, red, green, and blue (CMYRGB) colors were outputted by using Ink Cartridges 1 to 18 of Examples 1 to 5 and Comparative Example 1 described above and the recording apparatus shown in FIG. 8. Then, the resultant images were visually evaluated for color difference of an image at each of the solid portion of each color and a gradation portion between any one of Ink Cartridges 1 to 6 each storing an ink in an initial state and any one of Ink Cartridges 7 to 18 each storing a magenta ink part of which had evaporated on the basis of the following evaluation criteria. Table 5 shows the obtained results.

TABLE 5

Results of evaluation

| Ink cartridges used for forming images | | Example 1 | Example 2 | Example 3 | Example 4 | Example 5 | Comparative Example 1 |
|---|---|---|---|---|---|---|---|
| Color difference between any one of ink cartridges each storing ink in initial state (No. 1 to 6) and any one of ink cartridges each storing magenta ink corresponding to 10% evaporation (No. 7 to 12) | Each color (CMY) solid | ○ | ○ | ○ | ○ | ○ | X |
| | Secondary color (RGB) solid | ○ | ○ | ○ | ○ | Δ | X |
| | Gradation | ○ | ○ | ○ | Δ | X | X |
| Color difference between any one of ink | Each color (CMY) solid | ○ | ○ | Δ | ○ | X | X |

TABLE 5-continued

<table>
<tr><th colspan="2">Ink cartridges used for forming images</th><th colspan="6">Results of evaluation</th></tr>
<tr><td></td><td></td><td>Example 1</td><td>Example 2</td><td>Example 3</td><td>Example 4</td><td>Example 5</td><td>Comparative Example 1</td></tr>
<tr><td>cartridges each storing ink in initial state (No. 1 to 6) and any one of ink cartridges each storing magenta ink corresponding to 15% evaporation (No. 13 to 18)</td><td>Secondary color (RGB) solid</td><td>○</td><td>○</td><td>○</td><td>Δ</td><td>X</td><td>X</td></tr>
<tr><td></td><td>Gradation</td><td>○</td><td>○</td><td>Δ</td><td>X</td><td>X</td><td>X</td></tr>
</table>

○: Nearly no color difference is observed.
Δ: A slight color difference occurs.
X: A color difference is large.

Examples 6 to 10 and Comparative Example 2

Cyan Ink C1, Yellow Ink Y1, and Magenta Ink M1 shown in Table 2, and Cyan Ink C1 and Yellow Ink Y1 shown in Table 2 and Magenta Inks M2 to M6 shown in Table 3 were combined as shown in Table 6, whereby Ink Sets 1 to 6 were produced. Then, each of the resultant ink sets was stored in the ink cartridge shown in each of FIGS. 2 and 3, whereby ink cartridges of Examples 6 to 10 and Comparative Example 2 were produced. The resultant ink cartridges each storing an ink in an initial state were defined as Ink Cartridges 1 to 6.

An ink corresponding to 10% evaporation was produced by evaporating each ink of which each of the ink sets used in the foregoing was constituted at an evaporation rate of 10% in consideration of the case where all inks in each of the ink sets evaporated uniformly. Then, an ink set was produced by combining each magenta ink corresponding to 10% evaporation, a cyan ink, and a yellow ink as shown in Table 6. Each of the resultant ink sets was stored in the ink cartridge shown in each of FIGS. 2 and 3 in the same manner as that described above, whereby ink cartridges of Examples 6 to 10 and Comparative Example 2 were produced. Those ink cartridges each storing each ink corresponding to 10% evaporation were defined as Ink Cartridges 19 to 24.

An ink corresponding to 15% evaporation was produced by evaporating each ink of which each of the ink sets used in the foregoing was constituted at an evaporation rate of 15% in consideration of the case where all inks in each of the ink sets evaporated uniformly. Then, an ink set was produced by combining each magenta ink corresponding to 15% evaporation, a cyan ink, and a yellow ink as shown in Table 6. Each of the resultant ink sets was stored in the ink cartridge shown in each of FIGS. 2 and 3 in the same manner as that described above, whereby ink cartridges of Examples 6 to 10 and Comparative Example 2 were produced. Those ink cartridges each storing each ink corresponding to 15% evaporation were defined as Ink Cartridges 25 to 30.

In addition, all ink supplying/holding bodies (ink cartridge casings) are each constituted of a material formed of a resin obtained by incorporating 35% of a filler into an alloy of a styrene-based material and polyphenylene ether, and a material for an ink absorption member is polypropylene. The ink absorption member is sealed with a lid forming material having an air vent with a labyrinth structure as shown in each of FIGS. 2 and 3.

TABLE 6

Constitution of each of Ink Cartridges 1 to 6 and 19 to 30

<table>
<tr><th colspan="2"></th><th>Example 6</th><th>Example 7</th><th>Example 8</th><th>Example 9</th><th>Example 10</th><th>Comparative Example 2</th></tr>
<tr><td colspan="2">Ink cartridge No.</td><td>1</td><td>2</td><td>3</td><td>4</td><td>5</td><td>6</td></tr>
<tr><td>Stored inks</td><td>Cyan ink</td><td>C1</td><td>C1</td><td>C1</td><td>C1</td><td>C1</td><td>C1</td></tr>
<tr><td></td><td>Yellow ink</td><td>Y1</td><td>Y1</td><td>Y1</td><td>Y1</td><td>Y1</td><td>Y1</td></tr>
<tr><td></td><td>Magenta ink</td><td>M1</td><td>M2</td><td>M3</td><td>M4</td><td>M5</td><td>M6</td></tr>
<tr><td colspan="2">Ink cartridge No.</td><td>19</td><td>20</td><td>21</td><td>22</td><td>23</td><td>24</td></tr>
<tr><td>Stored inks</td><td>Cyan ink corresponding to 10% evaporation</td><td>C1</td><td>C1</td><td>C1</td><td>C1</td><td>C1</td><td>C1</td></tr>
<tr><td></td><td>Yellow ink corresponding to 10% evaporation</td><td>Y1</td><td>Y1</td><td>Y1</td><td>Y1</td><td>Y1</td><td>Y1</td></tr>
<tr><td></td><td>Magenta ink corresponding to 10% evaporation</td><td>M1</td><td>M2</td><td>M3</td><td>M4</td><td>M5</td><td>M6</td></tr>
<tr><td colspan="2">Ink cartridge No.</td><td>25</td><td>26</td><td>27</td><td>28</td><td>29</td><td>30</td></tr>
<tr><td>Stored inks</td><td>Cyan ink corresponding to 15% evaporation</td><td>C1</td><td>C1</td><td>C1</td><td>C1</td><td>C1</td><td>C1</td></tr>
<tr><td></td><td>Yellow ink corresponding to 15% evaporation</td><td>Y1</td><td>Y1</td><td>Y1</td><td>Y1</td><td>Y1</td><td>Y1</td></tr>
<tr><td></td><td>Magenta ink corresponding to 15% evaporation</td><td>M1</td><td>M2</td><td>M3</td><td>M4</td><td>M5</td><td>M6</td></tr>
</table>

TABLE 6-continued

Constitution of each of Ink Cartridges 1 to 6 and 19 to 30

|  | Example 6 | Example 7 | Example 8 | Example 9 | Example 10 | Comparative Example 2 |
|---|---|---|---|---|---|---|
| Ink density (g/ml) | | | | | | |
| C1: Minimum value for densities after 10% evaporation | 1.062 | 1.062 | 1.062 | 1.062 | 1.062 | 1.062 |
| D1: Maximum value for densities after 10% evaporation | 1.072 | 1.079 | 1.096 | 1.117 | 1.158 | 1.172 |
| C2: Minimum value for densities after 15% evaporation | 1.064 | 1.064 | 1.064 | 1.064 | 1.064 | 1.064 |
| D2: Maximum value for densities after 15% evaporation | 1.075 | 1.087 | 1.108 | 1.128 | 1.171 | 1.185 |
| (D1 − C1)/C1 | 0.009 | 0.016 | 0.032 | 0.052 | 0.090 | 0.104 |
| (D2 − C2)/C2 | 0.010 | 0.022 | 0.041 | 0.060 | 0.101 | 0.114 |

(Evaluation)

100% solid patch images and gradation images of cyan, magenta, yellow, red, green, and blue (CMYRGB) colors were outputted by using ink cartridges in an initial state and after evaporation of Examples 6 to 10 and Comparative Example 2 described above and the recording apparatus shown in FIG. 8. Then, the resultant images were visually evaluated for color difference of an image at each of the solid portion of each color and a gradation portion between any one of Ink Cartridges 1 to 6 each storing an ink in an initial state and any one of Ink Cartridges 19 to 30 each storing an ink of which had evaporated at an evaporative rate of 10% or 15% on the basis of the following evaluation criteria. Table 7 shows the obtained results.

Examples 11 to 14

Figure 10A:
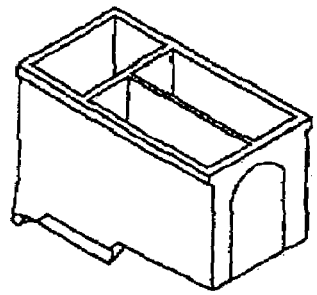
FIGS. 10A and 10B are perspective views each showing a liquid chamber structure of the ink cartridge.

Ink cartridges each structured in such a manner that liquid chambers inside it were separated by T lines as shown in FIG. 10A were prepared. Each of the ink cartridges had a difference between the maximum value and the minimum value for ratios $\beta/\alpha$ where $\beta$ represented the surface area of a portion of each of the liquid chambers exposed to the atmosphere in a unit of $cm^2$ and $\alpha$ represented the volume of the liquid chamber in a unit of $cm^3$ of 0.4, 0.5, or 0.6, and was formed as shown in each of FIGS. 2 and 3. Cyan Ink C1, Yellow Ink Y1, and Magenta Ink M4 described above were stored in each of the ink cartridges as shown in Table 8, whereby Ink Cartridges 31 to 33 of Examples 11 to 13 were produced.

TABLE 7

Results of evaluation

| Ink cartridges used for forming images | | Example 6 | Example 7 | Example 8 | Example 9 | Example 10 | Comparative Example 2 |
|---|---|---|---|---|---|---|---|
| Color difference between any one of ink cartridges each storing ink in initial state (No. 1 to 6) and any one of ink cartridges each storing magenta ink corresponding to 10% evaporation (No. 19 to 24) | Each color (CMY) solid | ○ | ○ | ○ | ○ | ○ | X |
| | Secondary color (RGB) solid | ○ | ○ | ○ | ○ | Δ | X |
| | Gradation | ○ | ○ | ○ | Δ | X | X |
| Color difference between any one of ink cartridges each storing ink in initial state (No. 1 to 6) and any one of ink cartridges each storing magenta ink corresponding to 15% evaporation (No. 25 to 30) | Each color (CMY) solid | ○ | ○ | ○ | ○ | X | X |
| | Secondary color (RGB) solid | ○ | ○ | ○ | Δ | X | X |
| | Gradation | ○ | ○ | Δ | X | X | X |

○: Nearly no color difference is observed.
Δ: A slight color difference occurs.
X: A color difference is large.

Figure 10B:
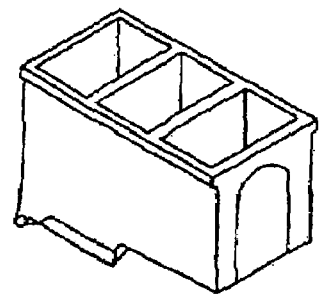

In addition, an ink cartridge structured in such a manner that liquid chambers inside it were separated to be in parallel with each other as shown in FIG. 10B was prepared. The ink cartridge had a difference between the maximum value and the minimum value for ratios $\beta/\alpha$ where $\beta$ represented the surface area of a portion of each of the liquid chambers exposed to the atmosphere in a unit of $cm^2$ and a represented the volume of the liquid chamber in a unit of $cm^3$ of 0.8, and was formed as shown in each of FIGS. 2 and 3. Cyan Ink C1, Yellow Ink Y1, and Magenta Ink M4 were stored in the ink cartridge as shown in Table 8 in the same manner as that described above, whereby Ink Cartridge 34 of Example 14 was produced.

It should be noted that, in each of the ink cartridges, Magenta Ink M4 was stored in a liquid chamber having the maximum ratio $\beta/\alpha$ and Yellow Ink Y1 was stored in a liquid chamber having the minimum ratio $\beta/\alpha$. In addition, each ink cartridge stored 1 ml of Magenta Ink M4 and 10 ml of any other ink in consideration of the case where only a magenta ink was used in an extremely large amount.

In addition, all ink supplying/holding bodies (ink cartridge casings) are each constituted of a material formed of a resin obtained by incorporating 35% of a filler into an alloy of a styrene-based material and polyphenylene ether, and a material for an ink absorption member is polypropylene. The ink absorption member is sealed with a lid forming material having an air vent with a labyrinth structure as shown in each of FIGS. 2 and 3.

TABLE 8

| | | Ink Cartridges 31 to 34 | | | |
|---|---|---|---|---|---|
| | | Example 11 | Example 12 | Example 13 | Example 14 |
| Ink cartridge No. | | 31 | 32 | 33 | 34 |
| Stored inks | Cyan ink | C1 | C1 | C1 | C1 |
| | Yellow ink | Y1 | Y1 | Y1 | Y1 |
| | Magenta ink | M4 | M4 | M4 | M4 |
| Difference between maximum value and minimum value for ratios $\beta/\alpha$ | | 0.4 | 0.5 | 0.6 | 0.8 |

100% solid patch images and gradation images of CMYRGB colors were outputted by using Ink Cartridges 31 to 34 of Examples 11 to 14 and the recording apparatus shown in FIG. 8, and were defined as images of initial ink cartridges. After the printing, the head part of each of the ink cartridges was capped with a recovery unit jig as a separate body, and the ink cartridges were left for 10 days in a thermo-hygrostat at 60° C. in a dry state. After having been left, each of the ink cartridges was detached from the recovery unit jig, and 100% solid patch images and gradation images of CMYRGB colors were similarly outputted. The images were defined as images of evaporated ink cartridges. The outputted images thus obtained of the initial ink cartridges and the evaporated ink cartridges were compared and visually evaluated for color difference at each of the solid portion of each color and a gradation portion on the basis of the above evaluation criteria. Table 9 shows the obtained results. In addition, the evaporation rate of each ink according to an evaporative test was determined by measuring the absorbances of each ink in each ink cartridge in an initial state and after evaporation, and was shown in Table 9.

TABLE 9

| | | Results of evaluation | | | |
|---|---|---|---|---|---|
| | | Example 11 | Example 12 | Example 13 | Example 14 |
| Ink evaporation rate after evaporative test (%) | Cyan ink | 3 | 3 | 2 | 3 |
| | Yellow ink | 3 | 3 | 2 | 1 |
| | Magenta ink | 8 | 10 | 12 | 15 |
| Color difference between outputted image in initial state and outputted image after evaporative test | Each color (CMY) solid | ○ | ○ | ○ | ○ |
| | Secondary color (RGB) solid | ○ | ○ | ○ | Δ |
| | Gradation | ○ | ○ | Δ | X |

As is apparent from the above results, when a difference between the maximum value and the minimum value for the ratios $\beta/\alpha$ is 0.5 or less, the evaporation rates of the respective inks are relatively uniform, and a color difference between an outputted image in an initial state and an outputted image after evaporation is small. It is also apparent from the results that the liquid chambers of an ink cartridge are relatively preferably separated by T lines.

(Evaluation of Gray Image Using Cyan Ink, Magenta Ink, and Yellow Ink)

(Production of Inks M7 to M11)

In addition, magenta inks (M7 to M11) having ink densities shown in Table 10 were each produced in the same manner as that of Ink M1 produced in the foregoing except that the amounts of ethylene urea, 1,5-pentanediol, and water of Ink M1 were adjusted. In addition, all the inks each had an initial ink density higher than those of Inks C1 and Y1.

TABLE 10

| | Properties of each ink | | | | |
|---|---|---|---|---|---|
| | M7 | M8 | M9 | M10 | M11 |
| | Ink density (g/ml) | | | | |
| A: Ink in initial state | 1.074 | 1.080 | 1.086 | 1.099 | 1.107 |
| B10: Ink corresponding to 10% evaporation | 1.083 | 1.090 | 1.098 | 1.119 | 1.132 |
| B15: Ink corresponding to 15% evaporation | 1.088 | 1.098 | 1.106 | 1.129 | 1.144 |

TABLE 10-continued

| | Properties of each ink | | | | |
|---|---|---|---|---|---|
| | M7 | M8 | M9 | M10 | M11 |
| (B10-A) Difference between density in initial state and density after 10% evaporation | 0.009 | 0.010 | 0.012 | 0.020 | 0.025 |
| (B15-A) Difference between density in initial state and density after 15% evaporation | 0.014 | 0.018 | 0.020 | 0.030 | 0.037 |

Examples 15 to 20

Cyan Ink C1, Yellow Ink Y1, and Magenta Ink M1 shown in Table 2, and Cyan Ink C1 and Yellow Ink Y1 shown in Table 2 and Magenta Inks M7 to M11 shown in Table 10 were combined as shown in Table 11, whereby ink sets were produced. Then, each of the resultant ink sets was stored in the ink cartridge shown in each of FIGS. 2 and 3, whereby ink cartridges of Examples 15 to 20 were produced. The resultant ink cartridges each storing an ink in an initial state were defined as Ink Cartridges 35 to 40.

A magenta ink corresponding to 10% evaporation was produced by evaporating each magenta ink of which each of the ink sets used in the foregoing was constituted at an evaporation rate of 10% in consideration of the case where only a magenta ink in each of the ink sets evaporated. Then, an ink set was produced by combining each magenta ink corresponding to 10% evaporation, a cyan ink, and a yellow ink as shown in Table 11. Each of the resultant ink sets was stored in the ink cartridge shown in each of FIGS. 2 and 3 in the same manner as that described above, whereby ink cartridges of Examples 15 to 20 were produced. Those ink cartridges each storing a magenta ink corresponding to 10% evaporation were defined as Ink Cartridges 41 to 46.

A magenta ink corresponding to 15% evaporation was produced by evaporating each magenta ink of which each of the ink sets used in the foregoing was constituted at an evaporation rate of 15% in consideration of the case where only a magenta ink in each of the ink sets evaporated. Then, an ink set was produced by combining each magenta ink corresponding to 15% evaporation, a cyan ink, and a yellow ink as shown in Table 11. Each of the resultant ink sets was stored in the ink cartridge shown in each of FIGS. 2 and 3 in the same manner as that described above, whereby ink cartridges of Examples 15 to 20 were produced. Those ink cartridges each storing a magenta ink corresponding to 15% evaporation were defined as Ink Cartridges 47 to 52.

In addition, all ink supplying/holding bodies (ink cartridge casings) are each constituted of a material formed of a resin obtained by incorporating 35% of a filler into an alloy of a styrene-based material and polyphenylene ether, and a material for an ink absorption member is polypropylene. The ink absorption member is sealed with a lid forming material having an air vent with a labyrinth structure as shown in each of FIGS. 2 and 3.

TABLE 11

| | Constitution of ink cartridge 35 to 52 | | | | | |
|---|---|---|---|---|---|---|
| | Example 15 | Example 16 | Example 17 | Example 18 | Example 19 | Example 20 |
| Ink cartridge No. | 35 | 36 | 37 | 38 | 39 | 40 |
| Stored inks  Cyan ink | C1 | C1 | C1 | C1 | C1 | C1 |
| Yellow ink | Y1 | Y1 | Y1 | Y1 | Y1 | Y1 |
| Magenta ink | M1 | M7 | M8 | M9 | M10 | M11 |
| Ink cartridge No. | 41 | 42 | 43 | 44 | 45 | 46 |
| Stored inks  Cyan ink | C1 | C1 | C1 | C1 | C1 | C1 |
| Yellow ink | Y1 | Y1 | Y1 | Y1 | Y1 | Y1 |
| Magenta ink corresponding to 10% evaporation | M1 | M7 | M8 | M9 | M10 | M11 |
| Ink cartridge No. | 47 | 48 | 49 | 50 | 51 | 52 |
| Stored inks  Cyan ink | C1 | C1 | C1 | C1 | C1 | C1 |
| Yellow ink | Y1 | Y1 | Y1 | Y1 | Y1 | Y1 |
| Magenta ink corresponding to 15% evaporation | M1 | M7 | M8 | M9 | M10 | M11 |
| | Ink density (g/ml) | | | | | |
| A1: Minimum value for initial densities | 1.056 | 1.056 | 1.056 | 1.056 | 1.056 | 1.056 |
| B1: Maximum value for densities after 10% evaporation | 1.072 | 1.083 | 1.090 | 1.098 | 1.119 | 1.132 |
| B2: Maximum value for densities after 15% evaporation | 1.075 | 1.088 | 1.098 | 1.106 | 1.129 | 1.144 |
| (B1 − A1)/A1 | 0.015 | 0.026 | 0.032 | 0.040 | 0.060 | 0.072 |
| (B2 − A1)/A1 | 0.018 | 0.030 | 0.040 | 0.047 | 0.069 | 0.083 |

(Evaluation)

Gray solid patch images having densities of 60% to 100% in an increment of 10% as high-image density gray images and gray solid patch images having densities of 10% to 50% in an increment of 10% as low-image density gray images were outputted by using Ink Cartridges 35 to 52 of Examples 15 to 20 described above and the recording apparatus shown in FIG. 8. Then, the resultant images were visually evaluated for color difference between an image of any one of Ink Cartridges 35 to 40 each storing an ink in an initial state and an image of any one of Ink Cartridges 41 to 46 each storing a magenta ink part of which had evaporated on the basis of the following evaluation criteria. A Professional Photopaper PR101 manufactured by Canon Inc. was used as a recording medium. Table 12 shows the obtained results.

ink cartridges each storing an ink in an initial state were defined as Ink Cartridges 35 to 40.

An ink corresponding to 10% evaporation was produced by evaporating each ink of which each of the ink sets used in the foregoing was constituted at an evaporation rate of 10% in consideration of the case where all inks in each of the ink sets evaporated uniformly. Then, an ink set was produced by combining each magenta ink corresponding to 10% evaporation, a cyan ink, and a yellow ink as shown in Table 13. Each of the resultant ink sets was stored in the ink cartridge shown in each of FIGS. 2 and 3 in the same manner as that described above, whereby ink cartridges of Examples 21 to 26 were produced. Those ink cartridges each storing each ink corresponding to 10% evaporation were defined as Ink Cartridges 53 to 58.

TABLE 12

Results of evaluation

| Ink cartridges used for forming images | Image used for evaluation | Example 15 | Example 16 | Example 17 | Example 18 | Example 19 | Example 20 |
|---|---|---|---|---|---|---|---|
| Color difference between any one of ink cartridges each storing ink in initial state (No. 35 to 40) and any one of ink cartridges each storing magenta ink corresponding to 10% evaporation (No. 41 to 46) | High-image density gray | ○ | ○ | ○ | ○ | ○ | X |
|  | Low-image density gray | ○ | ○ | ○ | ○ | Δ | X |
| Color difference between any one of ink cartridges each storing ink in initial state (No. 35 to 40) and any one of ink cartridges each storing magenta ink corresponding to 15% evaporation (No. 47 to 52) | High-image density gray | ○ | ○ | ○ | X | X | X |
|  | Low-image density gray | ○ | ○ | Δ | X | X | X |

○: Nearly no color difference is observed.
Δ: A slight color difference occurs.
X: A color difference is large.

Similar evaluation for "color difference between any one of ink cartridges each storing ink in initial state (No. 35 to 40) and any one of ink cartridges each storing magenta ink corresponding to 10% evaporation (No. 41 to 46)" of each of Examples 15 to 20 was performed for each of each color (CMY) solid and secondary color (RGB) solid. As a result, the result "Nearly no color difference is observed" was obtained for each case.

Examples 21 to 26

Cyan Ink C1, Yellow Ink Y1, and Magenta Ink M1 shown in Table 2, and Cyan Ink C1 and Yellow Ink Y1 shown in Table 2 and Magenta Inks M7 to M11 shown in Table 10 were combined as shown in Table 13, whereby ink sets were produced. Then, each of the resultant ink sets was stored in the ink cartridge shown in each of FIGS. 2 and 3, whereby ink cartridges of Examples 21 to 26 were produced. The resultant An ink corresponding to 15% evaporation was produced by evaporating each ink of which each of the ink sets used in the foregoing was constituted at an evaporation rate of 15% in consideration of the case where all inks in each of the ink sets evaporated uniformly. Then, an ink set was produced by combining each magenta ink corresponding to 15% evaporation, a cyan ink, and a yellow ink as shown in Table 13. Each of the resultant ink sets was stored in the ink cartridge shown in each of FIGS. 2 and 3 in the same manner as that described above, whereby ink cartridges of Examples 21 to 26 were produced. Those ink cartridges each storing each ink corresponding to 15% evaporation were define as Ink Cartridges 59 to 64.

In addition, all ink supplying/holding bodies (ink cartridge casings) are each constituted of a material formed of a resin obtain by incorporating 35% of a filler into an alloy of a styrene-based material and polyphenylene ether, and a material for an ink absorption member is polypropylene. The ink absorption member is sealed with a lid forming material having an air vent with a labyrinth structure as shown in each of FIGS. 2 and 3.

TABLE 13

Constitution of each of Ink Cartridges 35 to 40 and 53 to 64

|  |  | Example 21 | Example 22 | Example 23 | Example 24 | Example 25 | Example 26 |
|---|---|---|---|---|---|---|---|
|  |  | Ink cartridge No. | | | | | |
|  |  | 35 | 36 | 37 | 38 | 39 | 40 |
| Stored inks | Cyan ink | C1 | C1 | C1 | C1 | C1 | C1 |
|  | Yellow ink | Y1 | Y1 | Y1 | Y1 | Y1 | Y1 |
|  | Magenta ink | M1 | M7 | M8 | M9 | M10 | M11 |
|  |  | Ink cartridge No. | | | | | |
|  |  | 53 | 54 | 55 | 56 | 57 | 58 |
| Stored inks | Cyan ink corresponding to 10% evaporation | C1 | C1 | C1 | C1 | C1 | C1 |
|  | Yellow ink corresponding to 10% evaporation | Y1 | Y1 | Y1 | Y1 | Y1 | Y1 |
|  | Magenta ink corresponding to 10% evaporation | M1 | M7 | M8 | M9 | M10 | M11 |
|  |  | Ink cartridge No. | | | | | |
|  |  | 59 | 60 | 61 | 62 | 63 | 64 |
| Stored inks | Cyan ink corresponding to 15% evaporation | C1 | C1 | C1 | C1 | C1 | C1 |
|  | Yellow ink corresponding to 15% evaporation | Y1 | Y1 | Y1 | Y1 | Y1 | Y1 |
|  | Magenta ink corresponding to 15% evaporation | M1 | M7 | M8 | M9 | M10 | M11 |
|  |  | Ink density (g/ml) | | | | | |
| C1: Minimum value for densities after 10% evaporation | | 1.062 | 1.062 | 1.062 | 1.062 | 1.062 | 1.062 |
| D1: Maximum value for densities after 15% evaporation | | 1.072 | 1.083 | 1.090 | 1.098 | 1.119 | 1.132 |
| C2: Minimum value for densities after 15% evaporation | | 1.064 | 1.064 | 1.064 | 1.064 | 1.064 | 1.064 |
| D2: Maximum value for densities after 15% evaporation | | 1.075 | 1.088 | 1.098 | 1.106 | 1.129 | 1.144 |
| (D1 − C1)/C1 | | 0.009 | 0.020 | 0.026 | 0.034 | 0.054 | 0.066 |
| (D2 − C2)/C2 | | 0.010 | 0.023 | 0.032 | 0.039 | 0.061 | 0.075 |

(Evaluation)

Gray solid patch images having densities of 60% to 100% in an increment of 10% as high-image density gray images and gray solid patch images having densities of 10% to 50% in an increment of 10% as low-image density gray images were outputted by using ink cartridges in an initial state and after evaporation of Examples 21 to 26 described above and the recording apparatus shown in FIG. 8. Then, the resultant images were visually evaluated for color difference between an image of any one of Ink Cartridges 35 to 40 each storing an ink in an initial state and an image of any one of Ink Cartridges 53 to 64 each storing an ink of which had evaporated at an evaporative rate of 10 or 15% on the basis of the following evaluation criteria. A Professional Photopaper PR101 manufactured by Canon Inc. was used as a recording medium. Table 14 shows the obtained results.

TABLE 14

Results of evaluation

| Ink cartridges used for forming images | Image used for evaluation | Example 21 | Example 22 | Example 23 | Example 24 | Example 25 | Example 26 |
|---|---|---|---|---|---|---|---|
| Color difference between any one of ink cartridges each storing ink in initial state (No. 35 to 40) and any one of ink cartridges each storing magenta ink corresponding to 10% evaporation (No. 53 to 58) | High-image density gray | ○ | ○ | ○ | ○ | ○ | X |
| | Low-image density gray | ○ | ○ | ○ | ○ | Δ | X |

TABLE 14-continued

| Ink cartridges used for forming images | Image used for evaluation | Example 21 | Example 22 | Example 23 | Example 24 | Example 25 | Example 26 |
|---|---|---|---|---|---|---|---|
| Color difference between any one of ink cartridges each storing ink in initial state (No. 35 to 40) and any one of ink cartridges each storing magenta ink corresponding to 15% evaporation (No. 59 to 64) | High-image density gray | ○ | ○ | ○ | X | X | X |
| | Low-image density gray | ○ | ○ | Δ | X | X | X |

○: Nearly no color difference is observed.
Δ: A slight color difference occurs.
X: A color difference is large.

Similar evaluation for "color difference between any one of ink cartridges each storing ink in initial state (No. 35 to 40) and any one of ink cartridges each storing magenta ink corresponding to 10% evaporation (No. 53 to 58)" of each of Examples 21 to 26 was performed for each of each color (CMY) solid and secondary color (RGB) solid. As a result, the result "Nearly no color difference is observed" was obtained for each case.

Examples 27 to 29

Ink cartridges each structured in such a manner that liquid chambers inside it were separated by T lines as shown in FIG. 10A were prepared. Each of the ink cartridges had a difference between the maximum value and the minimum value for ratios β/α where β represented the surface area of a portion of each of the liquid chambers exposed to the atmosphere in a unit of cm² and α represented the volume of the liquid chamber in a unit of cm³ of 0.4, 0.5, or 0.6, and was formed as shown in FIG. 2. Cyan Ink C1, Yellow Ink Y1, and Magenta Ink M9 described above were stored in each of the ink cartridges as shown in Table 15, whereby Ink Cartridges 65 to 67 of Examples 27 to 29 were produced.

In addition, in each of the ink cartridges, Magenta Ink M9 was stored in a liquid chamber having the maximum ratio β/α and Yellow Ink Y1 was stored in a liquid chamber having the minimum ratio β/α. In addition, each ink cartridge stored 1 ml of Magenta Ink M9 and 10 ml of any other ink in consideration of the case where only a magenta ink was used in an extremely large amount.

In addition, all ink supplying/holding bodies (ink cartridge casings) are each constituted of a material formed of a resin obtained by incorporating 35% of a filler into an alloy of a styrene-based material and polyphenylene ether, and a material for an ink absorption member is polypropylene. The ink absorption member is sealed with a lid forming material having an air vent with a labyrinth structure as shown in each of FIGS. 2 and 3.

TABLE 15

Constitution of each of Ink Cartridges 65 to 67

| | | Example 27 | Example 28 | Example 29 |
|---|---|---|---|---|
| Ink cartridge No. | | 65 | 66 | 67 |
| Stored | Cyan ink | C1 | C1 | C1 |
| inks | Yellow ink | Y1 | Y1 | Y1 |
| | Magenta ink | M9 | M9 | M9 |
| Difference between maximum value and minimum value for ratios β/α | | 0.4 | 0.5 | 0.6 |

Gray solid patch images having densities of 60% to 100% in an increment of 10% as high-image density gray images and gray solid patch images having densities of 10% to 50% in an increment of 10% as low-image density gray images were outputted by using Ink Cartridges 65 to 67 of Examples 27 to 29 and the recording apparatus shown in FIG. 8, and were defined as images of initial ink cartridges. After the printing, the head part of each of the ink cartridges was capped with a recovery unit jig as a separate body, and the ink cartridges were left for 10 days in a thermo-hygrostat at 60° C. in a dry state. After having been left, each of the ink cartridges was detached from the recovery unit jig. Then, gray solid patch images having densities of 60% to 100% in an increment of 10% as high-image density gray images and gray solid patch images having densities of 10% to 50% in an increment of 10% as low-image density gray images were similarly outputted, and were defined as images of evaporated ink cartridges. The outputted images thus obtained of the initial ink cartridges and the evaporated ink cartridges were compared and visually evaluated for color difference between images on the basis of the above evaluation criteria. Table 16 shows the obtained results. In addition, the evaporation rate of each ink according to an evaporative test was determined by measuring the absorbances of each ink in each ink cartridge in an initial state and after evaporation, and was shown in Table 16.

TABLE 16

Results of evaluation

| | | Example 27 | Example 28 | Example 29 |
|---|---|---|---|---|
| Ink evaporation rate after evaporative test (%) | Cyan ink | 3 | 3 | 2 |
| | Yellow ink | 3 | 3 | 2 |
| | Magenta ink | 8 | 10 | 12 |
| Color difference between outputted image in initial state and outputted image after evaporative test | High-image density gray | ◯ | ◯ | Δ |
| | Low-image density gray | ◯ | ◯ | Δ |

As is apparent from the above results, when an ink cartridge in which liquid chambers are separated by T lines is used and a difference between the maximum value and the minimum value for the ratios β/α is 0.5 or less, the evaporation rates of the respective inks are relatively uniform, and a color difference between an outputted image in an initial state and an outputted image after evaporation is small.

(Evaluation of Gray Image Using Light Cyan Ink, Light Magenta Ink, and Yellow Ink)

(Production of Inks LC1 and LM1)

In addition, various components shown in Table 17 including a dye obtained in the foregoing were added in predetermined amounts shown in the table, and water was used to adjust the total amount of the components and water to 100 parts, whereby an ink was produced. That is, the respective components shown in Table 17 were mixed and sufficiently stirred for dissolution. After that, the resultant was filtered through a microfilter having a pore size of 0.2 μm (manufactured by Fuji Photo Film Co., Ltd.) under pressure, whereby each of a light cyan ink (LC1) and a light magenta ink (LM1) was prepared. As shown in Table 17, the yellow ink is identical to Ink Y1 described above. Then, the ink density under an environment of 25° C. of each of: the ink before evaporation (hereinafter referred to as "ink in an initial state") of each of those three kinds of inks; and inks each obtained by evaporating each of those three kinds of inks by 10 mass % or 15 mass % (hereinafter referred to as "ink corresponding to 10% evaporation" and "ink corresponding to 15% evaporation") was measured by using a standard densimeter. Table 17 shows the results of the measurement as well. It should be noted that an operation for evaporating an ink with a view to obtaining, for example, an ink corresponding to 10% evaporation was performed by holding the ink in a constant-temperature, constant-humidity state having a temperature of 30° C. and a humidity of 15%.

TABLE 17

Composition and ink properties of each ink (unit: parts)

| | | LC1 | Y1 | LM1 |
|---|---|---|---|---|
| Glycerin | | 12 | 8 | 8 |
| Ethylene glycol | | 9 | 8 | 9 |
| 2-pyrrolidone | | 5 | 4 | 4 |
| 1,5-pentanediol | | — | — | 4 |
| Ethylene urea | | — | 5 | — |
| Acetylenol E100 | | 0.8 | 0.8 | 0.8 |
| Dye | Cyan Dye 1 | 1.5 | — | — |
| | C.I. Direct Yellow 132 | — | 3 | — |
| | Magenta Dye 1 | — | — | 1.5 |
| Water | | Balance | Balance | Balance |

TABLE 17-continued

Composition and ink properties of each ink (unit: parts)

| | LC1 | Y1 | LM1 |
|---|---|---|---|
| Ink density (g/ml) | | | |
| A: Initial ink | 1.047 | 1.056 | 1.037 |
| B10: Ink corresponding to 10% evaporation | 1.056 | 1.062 | 1.044 |
| B15: Ink corresponding to 15% evaporation | 1.060 | 1.064 | 1.047 |

(Production of Inks LM2 to LM6)

In addition, light magenta inks (LM2 to LM6) having initial densities at 25° C. shown in Table 18 were each produced in the same manner as that of Ink LM1 produced in the foregoing except that the amounts of: solvents except Acetylenol E100; and water of Ink LM1 were adjusted. Further, the ink density of each of the ink corresponding to 10% evaporation and ink corresponding to 15% evaporation of each of the resultant three kinds of inks was measured in the same manner as that described above. Table 18 shows the results of the measurement as well.

TABLE 18

| | LM2 | LM3 | LM4 | LM5 | LM6 |
|---|---|---|---|---|---|
| Ink density (g/ml) | | | | | |
| A: Initial density | 1.035 | 1.032 | 1.030 | 1.028 | 1.020 |
| B10: Density after 10% evaporation | 1.041 | 1.037 | 1.034 | 1.032 | 1.025 |
| B15: Density after 15% evaporation | 1.044 | 1.040 | 1.037 | 1.035 | 1.029 |

Examples 30 to 35

Of Light Magenta Inks LM1 to LM6, Light Cyan Ink LC1, and Yellow Ink Y1 produced in the foregoing, the yellow ink has the largest initial density (see Tables 17 and 18). This is because the yellow ink has a larger colorant content than that of any other light ink. Accordingly, a density difference remarkably appears when only Yellow Ink Y1 among the above inks evaporates. A yellow ink corresponding to 10% evaporation and a yellow ink corresponding to 15% evaporation were produced in consideration of the case where only the yellow ink evaporated. Then, Ink Sets 68 to 73 according to examples comparative examples each constituted of a light cyan ink, a light magenta ink, and a black ink were each produced by combining those inks as shown in Table 19. In addition, Ink Sets A to C to be used together with Ink Sets 68 to 73 and each constituted of a cyan ink, a magenta ink, and a yellow ink were each produced according to the combination shown in Table 19. It should be noted that the terms "BCI-6Bk", "BCI-6C", and "BCI-6M" shown in the table represent a BCI-6 black ink, a BCI-6 cyan ink, and a BCI-6 magenta ink each manufactured by Canon Inc., respectively.

TABLE 19

Constitution of each ink set

| | Cyan ink | Magenta ink | Black ink or yellow ink |
|---|---|---|---|
| Ink Set 68 | LC1<br>A = 1.047<br>B10 = 1.056<br>B15 = 1.060 | LM1<br>A = 1.037<br>B10 = 1.044<br>B15 = 1.047 | BCI-6Bk |
| Ink Set 69 | LC1<br>A = 1.047<br>B10 = 1.056<br>B15 = 1.060 | LM2<br>A = 1.035<br>B10 = 1.041<br>B15 = 1.044 | BCI-6Bk |
| Ink Set 70 | LC1<br>A = 1.047<br>B10 = 1.056<br>B15 = 1.060 | LM3<br>A = 1.032<br>B10 = 1.037<br>B15 = 1.040 | BCI-6Bk |
| Ink Set 71 | LC1<br>A = 1.047<br>B10 = 1.056<br>B15 = 1.060 | LM4<br>A = 1.030<br>B10 = 1.034<br>B15 = 1.037 | BCI-6Bk |
| Ink Set 72 | LC1<br>A = 1.047<br>B10 = 1.056<br>B15 = 1.060 | LM5<br>A = 1.028<br>B10 = 1.032<br>B15 = 1.035 | BCI-6Bk |
| Ink Set 73 | LC1<br>A = 1.047<br>B10 = 1.056<br>B15 = 1.060 | LM6<br>A = 1.020<br>B10 = 1.025<br>B15 = 1.029 | BCI-6Bk |
| Ink Set A | BCI-6C | BCI-6M | Ink in initial state of Ink Y1<br>A = 1.056 |
| Ink Set B | BCI-6C | BCI-6M | Ink after 10% evaporation of Ink Y1<br>B10 = 1.062 |
| Ink Set C | BCI-6C | BCI-6M | Ink after 15% evaporation of Ink Y1<br>B15 = 1.064 |

Ink Sets 68 to 73 were each stored in the ink cartridge shown in each of FIGS. 2 and 3, and Ink Sets A to C to be used together with those ink sets were each stored in the ink cartridge shown in each of FIGS. 2 and 3. An image was formed by using those ink cartridges, and investigation was conducted into an influence of a change in ink property on a color balance. Table 20 shows the combination of ink cartridges used in the investigation. The respective ink cartridges were defined as follows: ink cartridges each storing an ink in an initial state as each ink of which each of Ink Sets 68 to 73 was constituted were defined as Ink Cartridges 68 to 73, an ink cartridge storing Ink Set A was defined as Ink Cartridge 74, an ink cartridge storing Ink Set B in consideration of the case where only Yellow Ink Y1 among the three color inks of Ink Set A evaporated by 10% was defined as Ink Cartridge 75, and an ink cartridge storing Ink Set C in consideration of the case where only Yellow Ink Y1 among the three color inks of Ink Set A evaporated by 15% was defined as Ink Cartridge 76.

In addition, all ink supplying/holding bodies (ink cartridge casings) are each constituted of a material formed of a resin obtained by incorporating 35% of a filler into an alloy of a styrene-based material and polyphenylene ether, and a material for an ink absorption member is polypropylene. The ink absorption member is sealed with a lid forming material having an air vent with a labyrinth structure as shown in each of FIGS. 2 and 3.

TABLE 20

Constitution of each of ink sets of examples and comparative examples

| | Ink cartridge No. | Ink set (*1) | Ink cartridge No. | Ink set (*2) | A1 (g/ml) |
|---|---|---|---|---|---|
| Example 30 | 68 | 68 | 74 | A | 1.037 |
| Example 31 | 69 | 69 | | A | 1.035 |
| Example 32 | 70 | 70 | | A | 1.032 |
| Example 33 | 71 | 71 | | A | 1.030 |
| Example 34 | 72 | 72 | | A | 1.028 |
| Example 35 | 73 | 73 | | A | 1.020 |

| | Ink cartridge No. | Ink set (*1) | Ink cartridge No. | Ink set (*3) | B1 (g/ml) | (B1 − A1)/A1 |
|---|---|---|---|---|---|---|
| Example 30 | 68 | 68 | 75 | B | 1.062 | 0.024 |
| Example 31 | 69 | 69 | | B | 1.062 | 0.026 |
| Example 32 | 70 | 70 | | B | 1.062 | 0.029 |
| Example 33 | 71 | 71 | | B | 1.062 | 0.031 |
| Example 34 | 72 | 72 | | B | 1.062 | 0.033 |
| Example 35 | 73 | 73 | | B | 1.062 | 0.041 |

| | Ink cartridge No. | Ink set (*1) | Ink cartridge No. | Ink set (*4) | B2 (g/ml) | (B2 − A1)/A1 |
|---|---|---|---|---|---|---|
| Example 30 | 68 | 68 | 76 | C | 1.064 | 0.026 |
| Example 31 | 69 | 69 | | C | 1.064 | 0.028 |

TABLE 20-continued

| Example 32 | 70 | 70 | C | 1.064 | 0.031 |
| Example 33 | 71 | 71 | C | 1.064 | 0.033 |
| Example 34 | 72 | 72 | C | 1.064 | 0.035 |
| Example 35 | 73 | 73 | C | 1.064 | 0.043 |

(*1): Ink set of each of examples and comparative examples
(*2): Ink set to be used together
(*3): Ink set to be used together and containing yellow ink corresponding to 10% evaporation
(*4): Ink set to be used together and containing yellow ink corresponding to 15% evaporation
A1: Minimum value for initial densities
B1: Density of yellow ink corresponding to 10% evaporation
B2: Density of yellow ink corresponding to 15% evaporation (Evaluation)

Ink Cartridges 68 to 73 were each mounted on the recording head H1000 of the recording apparatus shown in FIG. 9 while Ink Cartridges 74 to 76 to be used together with the ink cartridges were each mounted on the recording head H1001 of the recording apparatus shown in FIG. 9. Then, an image was formed. First, a color table in which the injection of each color was adjusted in such a manner that a gray line would be formed by using a yellow ink in an initial state, and a light cyan ink and a light magenta ink was produced. Gray solid patch gradation images were outputted by using the color table and the light cyan ink, the light magenta ink, and the yellow ink stored in each of the above ink cartridges. Then, evaluation for: a color difference when an image obtained by using any one of Cartridges 68 to 73 and Cartridge 74 each storing an ink in an initial state and an image obtained by using an ink of any one of Cartridges 68 to 73 and an ink of Cartridge 75 storing Ink Y1 corresponding to 10% evaporation were compared; or an OD difference at a printing density causing the maximum OD difference and a color difference at a printing density causing the maximum color difference when the image obtained by using any one of Cartridges 68 to 73 and Cartridge 74 and an image obtained by using an ink of any one of Cartridges 68 to 73 and Cartridge 76 storing Ink Y1 corresponding to 15% evaporation were compared was performed on the basis of the following evaluation criteria. Table 21 shows the results of the evaluation. It should be noted than an OD value and a hue measured by using a Spectrolino manufactured by GretagMacbeth, and a color difference was calculated by using the OD value and the hue.

(OD difference)

TABLE 21

| | Results of evaluation | | | | | |
| --- | --- | --- | --- | --- | --- | --- |
| | Example 30 | Example 31 | Example 32 | Example 33 | Example 34 | Example 35 |
| Difference between OD value in initial state and OD value after 10% evaporation | ○ | ○ | ○ | ○ | ○ | X |
| Difference between color in initial state and color after 10% evaporation | ○ | ○ | ○ | Δ | Δ | X |
| Difference between OD value in | ○ | ○ | ○ | Δ | ○ | X |

TABLE 21-continued

| | Results of evaluation | | | | | |
| --- | --- | --- | --- | --- | --- | --- |
| | Example 30 | Example 31 | Example 32 | Example 33 | Example 34 | Example 35 |
| initial state and OD value after 15% evaporation | | | | | | |
| Difference between color in initial state and color after 15% evaporation | ○ | ○ | Δ | Δ | X | X |

○: The maximum OD difference as compared to an initial state is less than 0.1.
Δ: The maximum OD difference as compared to an initial state is 0.1 or more and less than 0.2.
X: The maximum OD difference as compared to an initial state is 0.2 or more.
(Color difference)
○: The maximum color difference as compared to an initial state is less than 4.
Δ: The maximum color difference as compared to an initial state is 4 or more and less than 8.
X: The maximum color difference as compared to an initial state is 8 or more.

Similar evaluation for each of "difference between OD value in initial state and OD value after 10% evaporation" and "difference between color in initial state and color after 10% evaporation" was performed for each of each color (light C, light M, Y) solid and secondary color (RGB) solid of each of Examples 30 to 35. As a result, the result of evaluation corresponding to 0 described above was obtained for each case.

Examples 36 to 41

Next, inks each corresponding to 10% evaporation were produced by evaporating the respective inks of which Ink Sets 68 to 73 and Ink Set A were constituted under the above-mentioned condition at an evaporation rate of 10% in consideration of the case where the respective inks evaporated uniformly. Ink Sets 74 to 85 used in examples and comparative examples and each constituted of a light cyan ink, a light magenta ink, and a black ink, and Ink Sets D and E to be used together with these ink sets and each constituted of a cyan ink, a magenta ink, and a yellow ink were each produced by combining the resultant inks each corresponding to 10% evaporation as shown in Table 22. It should be noted that the terms "BCI-6Bk", "BCI-6C", and "BCI-6M" represent a BCI-6 black ink, a BCI-6 cyan ink, and a BCI-6 magenta ink each manufactured by Canon Inc., respectively.

TABLE 22

Constitution of each ink set

| | Cyan ink | Magenta ink | Black ink or yellow ink |
|---|---|---|---|
| Ink Set 74 | Ink LC1 corresponding to 10% evaporation B10 = 1.056 | Ink LM1 corresponding to 10% evaporation B10 = 1.044 | BCI-6Bk corresponding to 10% evaporation |
| Ink Set 75 | | Ink LM2 corresponding to 10% evaporation B10 = 1.041 | |
| Ink Set 76 | | Ink LM3 corresponding to 10% evaporation B10 = 1.037 | |
| Ink Set 77 | | Ink LM4 corresponding to 10% evaporation B10 = 1.034 | |
| Ink Set 78 | | Ink LM5 corresponding to 10% evaporation B10 = 1.032 | |
| Ink Set 79 | | Ink LM6 corresponding to 10% evaporation B10 = 1.025 | |
| Ink Set 80 | Ink LC1 corresponding to 15% evaporation B15 = 1.060 | Ink LM1 corresponding to 15% evaporation B15 = 1.047 | BCI-6Bk corresponding to 15% evaporation |
| Ink Set 81 | | Ink LM2 corresponding to 15% evaporation B15 = 1.044 | |
| Ink Set 82 | | Ink LM3 corresponding to 15% evaporation B15 = 1.040 | |
| Ink Set 83 | | Ink LM4 corresponding to 15% evaporation B15 = 1.037 | |
| Ink Set 84 | | Ink LM5 corresponding to 15% evaporation B15 = 1.035 | |
| Ink Set 85 | | Ink LM6 corresponding to 15% evaporation B15 = 1.029 | |
| Ink Set D | BCI-6C corresponding to 10% evaporation | BCI-6M corresponding to 10% evaporation | Ink Y1 corresponding to 10% evaporation B10 = 1.062 |
| Ink Set E | BCI-6C corresponding to 15% evaporation | BCI-6M corresponding to 15% evaporation | Ink Y1 corresponding to 15% evaporation B15 = 1.064 |

Ink Sets 68 to 73 shown in Table 19 were each stored in the ink cartridge shown in each of FIGS. 2 and 3, and Ink Set A was stored in the ink cartridge shown in each of FIGS. 2 and 3, whereby Ink Cartridges 68 to 73 and Ink Cartridge 74 of Examples 36 to 41 and Comparative Example 6 shown in Table 23 each constituted of an ink in an initial state were produced. In addition, Ink Sets 74 to 79 shown in Table 22 and each constituted of an ink corresponding to 10% evaporation were each stored in the ink cartridge shown in FIG. 2 in consideration of the case where all inks of which Ink Sets 68 to 73 and Ink Set A were constituted evaporated uniformly by 10%, and the resultant ink cartridges were defined as Ink Cartridges 77 to 82. In addition, Ink Set D to be used together with the above ink sets and shown in Table 22 was stored in the ink cartridge shown in each of FIGS. 2 and 3, and the resultant ink cartridge was defined as Ink Cartridge 89. In addition, Ink Sets 80 to 85 shown in Table 22 were each stored in the ink cartridge shown in each of FIGS. 2 and 3 in consideration of the case where all ink sets evaporated uniformly by 15%, and the resultant ink cartridges were defined as Ink Cartridges 83 to 88. In addition, Ink Set E to be used together with the above ink sets and shown in Table 22 was stored in the ink cartridge shown in each of FIGS. 2 and 3, and the resultant ink cartridge was defined as Ink Cartridge 90.

In addition, all ink supplying/holding bodies (ink cartridge casings) are each constituted of a material formed of a resin obtained by incorporating 35% of a filler into an alloy of a styrene-based material and polyphenylene ether, and a material for an ink absorption member is polypropylene. The ink absorption member is sealed with a lid forming material having an air vent with a labyrinth structure as shown in each of FIGS. 2 and 3.

TABLE 23

Constitution of each of ink sets of examples and comparative examples

| | Ink cartridge No. | Ink set (*1) | Ink cartridge No. | Ink set (*2) |
|---|---|---|---|---|
| Example 36 | 68 | 68 | 74 | A |
| Example 37 | 69 | 69 | | A |
| Example 38 | 70 | 70 | | A |
| Example 39 | 71 | 71 | | A |

TABLE 23-continued

| | | | | | | | |
|---|---|---|---|---|---|---|---|
| Example 40 | 72 | 72 | | | | | A |
| Example 41 | 73 | 73 | | | | | A |

| | Ink cartridge No. | Ink set (*3) | Ink cartridge No. | Ink set (*4) | C1 (g/ml) | D1 (g/ml) | (D1 − C1)/ C1 |
|---|---|---|---|---|---|---|---|
| Example 36 | 77 | 74 | 89 | D | 1.044 | 1.062 | 0.017 |
| Example 37 | 78 | 75 | | D | 1.041 | 1.062 | 0.020 |
| Example 38 | 79 | 76 | | D | 1.037 | 1.062 | 0.024 |
| Example 39 | 80 | 77 | | D | 1.034 | 1.062 | 0.027 |
| Example 40 | 81 | 78 | | D | 1.030 | 1.062 | 0.029 |
| Example 41 | 82 | 79 | | D | 1.025 | 1.062 | 0.036 |

| | Ink cartridge No. | Ink set (*5) | Ink cartridge No. | Ink set (*6) | C2 (g/ml) | D2 (g/ml) | (D2 − C2)/ C2 |
|---|---|---|---|---|---|---|---|
| Example 36 | 83 | 80 | 90 | E | 1.047 | 1.064 | 0.016 |
| Example 37 | 84 | 81 | | E | 1.044 | 1.064 | 0.019 |
| Example 38 | 85 | 82 | | E | 1.040 | 1.064 | 0.023 |
| Example 39 | 86 | 83 | | E | 1.037 | 1.064 | 0.026 |
| Example 40 | 87 | 84 | | E | 1.034 | 1.064 | 0.028 |
| Example 41 | 88 | 85 | | E | 1.029 | 1.064 | 0.034 |

(*1): Ink set of each of examples and comparative examples
(*2): Ink set to be used together
(*3): Ink set corresponding to 10% evaporation of each of examples and comparative examples
(*4): Ink set corresponding to 10% evaporation to be used together
(*5): Ink set corresponding to 15% evaporation of each of examples and comparative examples
(*6): Ink set corresponding to 15% evaporation to be used together
C1: Minimum value for densities at the time of evaporation by 10%
D1: Density of yellow ink at the time of evaporation by 10%
C2: Minimum value for densities at the time of evaporation by 15%
D2: Density of yellow ink at the time of evaporation by 15%

(Evaluation)

Ink Cartridges 68 to 73, 77 to 82, and 83 to 88 were each mounted on the recording head H1000 of the recording apparatus shown in FIG. 9 while Ink Cartridges 74, 89, and 90 to be used together with the ink cartridges were each mounted on the recording head H1001 of the recording apparatus shown in FIG. 9. Then, an image was formed. Gray solid patch gradation images were outputted by using the above-mentioned color table and the light cyan ink, the light magenta ink, and the yellow ink stored in those ink cartridges. Then, evaluation for: a color difference when an image obtained by using any one of Cartridges 68 to 73 and Cartridge 74 each storing an ink in an initial state and an image obtained by using an ink of any one of Cartridges 77 to 82 and an ink of Cartridge 89 storing an ink corresponding to 10% evaporation were compared; or an OD difference at a printing density causing the maximum OD difference and a color difference at a printing density causing the maximum color difference when the image obtained by using any one of Cartridges 68 to 73 and Cartridge 74 and an image obtained by using an ink of any one of Cartridges 83 to 88 and Cartridge 90 storing an ink corresponding to 15% evaporation were compared was performed on the basis of the evaluation criteria as described above. Table 24 shows the results of the evaluation. It should be noted that an OD value and a hue were measured by using a Spectrolino manufactured by Gretag-Macbeth, and a color difference was calculated by using the OD value and the hue.

TABLE 24

| | Example 36 | Example 37 | Example 38 | Example 39 | Example 40 | Example 41 |
|---|---|---|---|---|---|---|
| Difference between OD value in initial state and OD value after 10% evaporation | ◯ | ◯ | ◯ | ◯ | ◯ | x |
| Difference between color in initial state and color after 10% evaporation | ◯ | ◯ | ◯ | Δ | Δ | x |
| Difference between OD value in initial state and OD value after 15% evaporation | ◯ | ◯ | ◯ | ◯ | ◯ | x |

TABLE 24-continued

|  | Example 36 | Example 37 | Example 38 | Example 39 | Example 40 | Example 41 |
|---|---|---|---|---|---|---|
| Difference between color in initial state and color after 15% evaporation | ○ | ○ | ○ | Δ | Δ | x |

Similar evaluation for each of "difference between OD value in initial state and OD value after 10% evaporation" and "difference between color in initial state and color after 10% evaporation" was performed for each of each color (light C, light M, Y) solid and secondary color (RGB) solid of each of Examples 36 to 41. As a result, the result of evaluation corresponding to ○ described above was obtained for each case.

Examples 42 to 45

Ink cartridges each structured in such a manner that liquid chambers inside it were separated by T lines as shown in FIG. 10A were prepared. Each of the ink cartridges had a difference between the maximum value and the minimum value for ratios $\beta/\alpha$ where $\beta$ represented the surface area of a portion of each of the liquid chambers exposed to the atmosphere in a unit of $cm^2$ and $\alpha$ represented the volume of the liquid chamber in a unit of $cm^3$ of 0.4, 0.5, or 0.6, and was formed as shown in FIG. 2. Light Cyan Ink LC1, Yellow Ink Y1, and Light Magenta Ink LM5 described above were stored in each of the ink cartridges as shown in Table 25 and 26, whereby Ink Cartridges 91 to 94 of Examples 42 to 44 were produced.

In addition, an ink cartridge structured in such a manner that liquid chambers inside it were separated to be in parallel with each other as shown in FIG. 10B was prepared. The ink cartridge had a difference between the maximum value and the minimum value for ratios $\beta/\alpha$ where $\beta$ represented the surface area of a portion of each of the liquid chambers exposed to the atmosphere in a unit of $cm^2$ and $\alpha$ represented the volume of the liquid chamber in a unit of $cm^3$ of 0.8, and was formed as shown in FIG. 2. Light Cyan Ink LC1, Yellow Ink Y1, and Light Magenta Ink LM6 were stored in the ink cartridge as shown in each of Tables 25 and 26 in the same manner as that described above, whereby Ink Cartridge 94 of Example 45 was produced.

Further, in each of the ink cartridges, Yellow Ink Y1 was stored in a liquid chamber having the maximum ratio $\beta/\alpha$ and Light Magenta Ink LM6 was stored in a liquid chamber having the minimum ratio $\beta/\alpha$. In addition, each ink cartridge stored 1 ml of Yellow Ink Y1 and 10 ml of any other ink in consideration of the case where only a yellow ink was used in an extremely large amount.

In addition, all ink supplying/holding bodies (ink cartridge casings) are each constituted of a material formed of a resin obtained by incorporating 35% of a filler into an alloy of a styrene-based material and polyphenylene ether, and a material for an ink absorption member is polypropylene. The ink absorption member is sealed with a lid forming material having an air vent with a labyrinth structure as shown in each of FIGS. 2 and 3.

TABLE 25

Constitution of each ink set

|  | Cyan ink | Magenta ink | Black ink or yellow ink |
|---|---|---|---|
| Ink Set 86 | LC1 | LM6 | BCI-6Bk |
| Ink Set F | BCI-6C | BCI-6M | Y1 |

TABLE 26

Constitution of each of ink sets of examples and comparative examples

|  | Difference between maximum value and minimum value for ratios $\beta/\alpha$ | Ink cartridge No. | Ink Set | Ink cartridge No. | Ink Set |
|---|---|---|---|---|---|
| Example 42 | 0.4 | 91 | 86 | 28 | F |
| Example 43 | 0.5 | 92 | 86 | 28 | F |
| Example 44 | 0.6 | 93 | 86 | 28 | F |
| Example 45 | 0.8 | 94 | 86 | 28 | F |

Gray solid patch gradation images were outputted by using the yellow inks, light cyan inks, and light magenta inks of Ink Cartridges 91 to 94 of Examples 42 to 45, the recording apparatus shown in FIG. 9, and the above-mentioned color table, and were defined as images of initial ink cartridges. After the printing, the head part of each of the ink cartridges was capped with a recovery unit jig as a separate body, and the ink cartridges were left for 10 days in a thermo-hygrostat at 60° C. in a dry state. After having been left, each of the ink cartridges was detached from the recovery unit jig. Then, gray solid patch gradation images were similarly outputted by using a yellow ink, a light cyan ink, and a light magenta ink, and were defined as images of evaporated ink cartridges. The outputted images thus obtained of the initial ink cartridges and the evaporated ink cartridges were compared and visually evaluated for color difference at each of the solid portion of each color and a gradation portion on the basis of the above evaluation criteria. Table 27 shows the obtained results. In addition, the evaporation rate of each ink according to an evaporative test was determined by measuring the absorbances of each ink in each ink cartridge in an initial state and after evaporation, and was shown in Table 27. It should be noted that an OD value and a hue were measured by using a Spectrolino manufactured by GretagMacbeth, and a color difference was calculated by using the OD value and the hue.

TABLE 27

| | Results of evaluation | | | | |
|---|---|---|---|---|---|
| | Ink evaporation rate after evaporative test (%) | | | Evaluation | |
| | Light cyan ink | Light magenta ink | Yellow ink | OD difference | Color difference |
| Example 42 | 3 | 3 | 8 | ◯ | ◯ |
| Example 43 | 3 | 3 | 10 | ◯ | ◯ |
| Example 44 | 2 | 2 | 12 | ◯ | Δ |
| Example 45 | 2 | 1 | 15 | Δ | Δ |

As is apparent from the above results, when a difference between the maximum value and the minimum value for the ratios β/α is 0.5 or less, the evaporation rates of the respective inks are relatively uniform, and a color difference between an outputted image in an initial state and an outputted image after evaporation is small. It is also apparent from the results that the liquid chambers of an ink cartridge are relatively preferably separated by T lines.

The present application claims the priority of Japanese Patent Applications No. 2005-200760, No. 2005-200761, and No. 2005-200955 filed on the eighth day of Jul., 2005, the contents of which are incorporated herein by reference.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-200760, filed Jul. 8, 2005, 2005-200955, filed Jul. 8, 2005 and 2005-200761 Jul. 8, 2005 which are hereby incorporated by reference herein in their entirety.

What is claimed is:

1. An ink cartridge, comprising:
an ink-jet head; and
plural liquid chambers storing inks different from each other,
wherein a minimum value A1 (g/ml) for ink densities of the inks stored in the plural liquid chambers and a maximum value B1 (g/ml) for ink densities of inks each obtained by evaporating 10 mass % of each of the inks stored in the plural liquid chambers satisfy a relationship of (B1−A1)/A1≦0.100.

2. An ink cartridge according to claim 1, wherein A1 and a maximum value B2 (g/ml) for ink densities of inks each obtained by evaporating 15 mass % of each of the inks stored in the plural liquid chambers satisfy a relationship of (B2−A1)/A1≦0.070.

3. An ink cartridge according to claim 1, wherein a minimum value C1 (g/ml) and a maximum value D1 (g/ml) for the ink densities of the inks each obtained by evaporating 10 mass % of each of the inks stored in the plural liquid chambers satisfy a relationship of (D1−C1)/C1≦0.090.

4. An ink cartridge according to claim 2, wherein a minimum value C2 (g/ml) and a maximum value D2 (g/ml) for the ink densities of the inks each obtained by evaporating 15 mass % of each of the inks stored in the plural liquid chambers satisfy a relationship of (D2−C2)/C2≦0.060.

5. An ink cartridge according to claim 1, wherein a difference between an ink density of each of the inks stored in the plural liquid chambers and an ink density of an ink obtained by evaporating 10 mass % of the ink is 0.030 g/ml or less.

6. An ink cartridge according to claim 2, wherein a difference between an ink density of each of the inks stored in the plural liquid chambers and an ink density of an ink obtained by evaporating 15 mass % of the ink is 0.020 g/ml or less.

7. An ink cartridge according to claim 1, wherein the inks stored in the plural liquid chambers comprise a yellow ink, a magenta ink, and a cyan ink.

8. An ink cartridge according to claim 1, wherein a difference between a maximum value and a minimum value for ratios β/α, where β represents an area of a surface in which an ink of each of the liquid chambers can evaporate in a unit of $cm^2$ and α represents a volume of the liquid chamber in a unit of $cm^3$, is 0.5 or less.

9. An ink cartridge according to claim 1, wherein a component material of each of the liquid chambers comprises polyphenylene oxide.

10. An ink cartridge according to claim 1, wherein A1 satisfies a relationship of 1.020≦A1≦1.056 (i.e., A1 is not less than 1.020 and not more than 1.056) and B1 satisfies a relationship of 1.062≦B1≦1.158 (i.e., B1 is not less than 1.062 and not more than 1.158).

11. An ink cartridge according to claim 3, wherein C1 satisfies a relationship of 1.025≦C1≦1.062 (i.e., C1 is not less than 1.025 and not more than 1.062) and D1 satisfies a relationship of 1.062≦D1≦1.158 (i.e., D1 is not less than 1.062 and not more than 1.158).

* * * * *